(12) United States Patent
Use et al.

(10) Patent No.: US 6,951,607 B2
(45) Date of Patent: *Oct. 4, 2005

(54) MOBILE POLLUTION TRAP AND METHOD

(76) Inventors: Clark Joseph Use, 2208 Liberty La., Conyers, GA (US) 30094; John Sebastian Moll, 1495 Chalet Cir., Lawrenceville, GA (US) 30043

( * ) Notice: Subject to any disclaimer, the term of this patent is extended or adjusted under 35 U.S.C. 154(b) by 64 days.

This patent is subject to a terminal disclaimer.

(21) Appl. No.: 10/310,449

(22) Filed: Dec. 5, 2002

(65) Prior Publication Data

US 2003/0164341 A1 Sep. 4, 2003

Related U.S. Application Data

(63) Continuation-in-part of application No. 10/217,186, filed on Aug. 12, 2002.
(60) Provisional application No. 60/345,128, filed on Dec. 31, 2001.

(51) Int. Cl.[7] .................... B01D 17/028; B01D 36/04
(52) U.S. Cl. ................ 210/122; 210/131; 210/241; 210/305; 210/521; 210/532.1; 210/540
(58) Field of Search .......................... 210/122, 242.1, 210/242.3, 299, 300, 305, 307, 521, 522, 538, 540, 194, 195.1, 532.1, 131, 155, 156, 241

(56) References Cited

U.S. PATENT DOCUMENTS

| | | | | |
|---|---|---|---|---|
| 745,519 A | * | 12/1903 | Pravicha et al. ............ | 210/521 |
| 911,314 A | * | 2/1909 | Maranville ................... | 210/540 |
| 1,200,951 A | * | 10/1916 | Kelly, Jr. .................... | 210/540 |
| 1,437,007 A | * | 11/1922 | Otterson ..................... | 210/241 |
| 1,666,756 A | | 4/1928 | Sass | |
| 1,758,743 A | | 5/1930 | Harman | |
| 2,330,508 A | * | 9/1943 | McColl .................. | 210/242.3 |
| 2,753,877 A | * | 7/1956 | McKnight ................... | 210/241 |
| 2,782,929 A | * | 2/1957 | Colket ...................... | 210/532.1 |
| 3,971,719 A | * | 7/1976 | Peters ........................ | 210/540 |

(Continued)

OTHER PUBLICATIONS

Pandit, Ashok, PH.D., P.E. & Gopatakrishnan, Ganesh; "Physical Modeling of a Stormwater Sediment Removal Box"; Jun. 1996; 19 pgs; Civil Engineering Program, Florida Institute of Technology; Melbourne.

Pitt, Robert, Robertson, Brian, Barron, Patricia, Ayyoubi, Ali, Clark, Shirley; "Stormwater Treatment at Critical Areas the Multi–Chambered Treatment Train (MCTT)"; Mar. 1999, 14 pgs; Department of Civil and Environmental Engineering, The University of Alabama at Birmingham; Birmingham.

"Storm Water Technology Fact Sheet Water Quality Inlets"; Berg. 1991; 6 pgs; EPA 832–F–99–029; United States Environmental Protection Agency Office of Water; Washington, D.C.

Primary Examiner—Christopher Upton
(74) Attorney, Agent, or Firm—Gardner Groff, P.C.

(57) ABSTRACT

A mobile chamber has an inlet for receiving polluted water and an outlet for pollution-free water to flow out. A mobile trap operating system includes an output pump, an input pump, a pollution tank, and a liquid tank, all operably connected to the chamber. Within the chamber is a collection reservoir with a skimming edge for skimming off floating pollutants such as motor oil, other hydrocarbons, and detergents. Alternative embodiments include a screen, baffles, and/or pivotal filter for further separating the pollutants from the water. A method for separating the pollutants from the water includes directing the water from the water tank at the pollutants and into a collection pool of polluted water, drawing the polluted water into the chamber, receiving the skimmed pollutants from the collection reservoir into the pollution tank, and receiving the pollutant-free liquid from the chamber into the liquid tank.

24 Claims, 10 Drawing Sheets

U.S. PATENT DOCUMENTS

| | | | | |
|---|---|---|---|---|
| 4,064,054 A | * | 12/1977 | Anderson et al. | 210/521 |
| 4,132,652 A | * | 1/1979 | Anderson et al. | 210/521 |
| 4,157,969 A | * | 6/1979 | Thies | 210/521 |
| 4,268,396 A | | 5/1981 | Lowe | |
| 4,830,755 A | * | 5/1989 | Hardin | 210/241 |
| 4,980,070 A | * | 12/1990 | Lieberman | 210/522 |
| 5,132,010 A | * | 7/1992 | Ossenkop | 210/540 |
| 5,286,383 A | | 2/1994 | Verret et al. | |
| 5,378,376 A | * | 1/1995 | Zenner | 210/540 |
| 5,543,064 A | | 8/1996 | Batten | |
| 5,989,415 A | * | 11/1999 | Hirs | 210/521 |
| 6,079,571 A | | 6/2000 | Stowell | |
| 6,190,545 B1 | | 2/2001 | Williamson | |
| 6,428,692 B2 | | 8/2002 | Happel | |
| 6,478,954 B1 | | 11/2002 | Turner, Jr. et al. | |
| 2002/0057944 A1 | | 5/2002 | Adams | |
| 2003/0121847 A1 | | 7/2003 | Joseph et al. | |
| 2003/0121848 A1 | | 7/2003 | Use et al. | |
| 2003/0121849 A1 | | 7/2003 | Use et al. | |
| 2003/0121850 A1 | | 7/2003 | Use et al. | |

\* cited by examiner

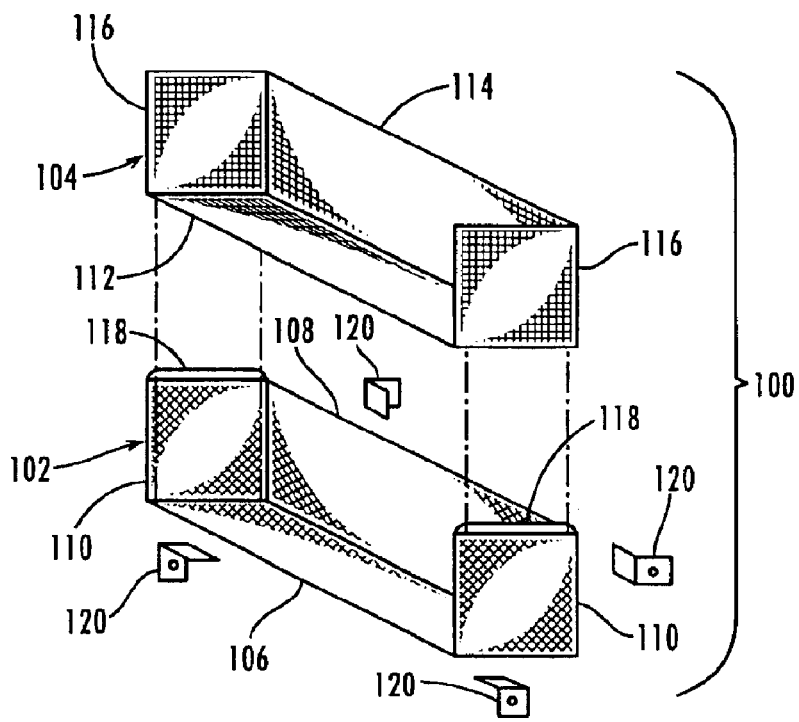
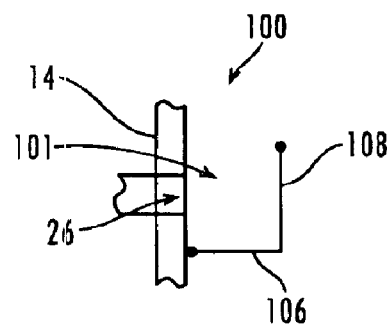
Fig. 3
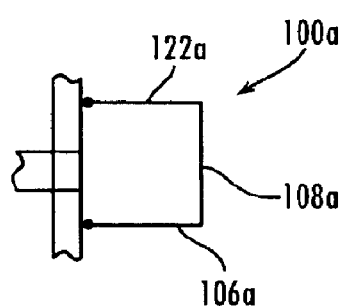
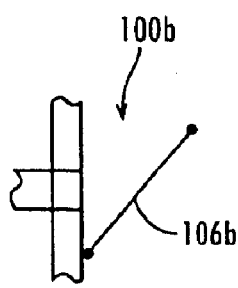
Fig. 4
Fig. 5A
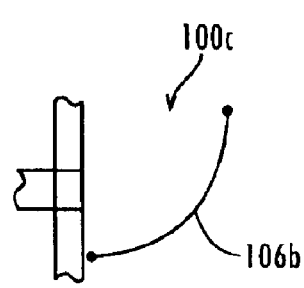
Fig. 5B    Fig. 5C

MOBILE POLLUTION TRAP AND METHOD

CROSS-REFERENCE TO RELATED APPLICATIONS

This application claims the priority benefit of U.S. Provisional Patent Application Ser. No. 60/345,128, filed Dec. 31, 2001, and is a continuation in part of U.S. Non-Provisional patent application Ser. No. 10/217,186, filed Aug. 12, 2002, which are hereby incorporated herein by reference in its entirety.

TECHNICAL FIELD

The present invention relates generally to water pollution traps and, more particularly, to a mobile separator for separating and collecting oil and/or various other pollutants from water.

BACKGROUND OF THE INVENTION

During rainstorms, water that is not absorbed into the ground runs off into storm sewer systems for delivery into freshwater systems such as streams, rivers, lakes, and wetlands. While flowing across parking lots, landscaped areas, and other surfaces, the storm-water runoff picks up debris and pollutants and carries them into the storm sewer systems. Particularly large amounts of pollutants are picked up at shopping centers with large parking lots, oil-change and auto-repair shops, gas stations, and so forth. These pollutants include motor oil and other hydrocarbons, particulate matter such as sand and grit, and miscellaneous debris such as vegetative matter, paper, plastic, and foam cups. For example, about 200 pounds of miscellaneous debris and 500 pounds of sand and grit is commonly carried off by storm-water runoff from some one-acre parking lots in 90 days.

To maintain freshwater systems, most cities and counties have regulations requiring that some of the pollutants be removed from the storm-water runoff before entering their storm sewer systems. In order to meet these regulations, facilities typically install on-site pollution traps to filter the storm-water runoff. These pollution traps are sometimes referred to as "oil/grit separators."

Most conventional pollution traps provide only "first flush" filtration during the typical local storm event, but permit bypassing the filtration stage for larger storms. In fact, many jurisdictions require bypassing, some even at typical storm water flows. Bypassing filtration is a problem because most pollutants are more easily picked up and transported by storm water during higher flow periods. Unfortunately, just when the traps are needed most, a lot of pollutants bypass them and are delivered into the storm sewer systems. And most pollution traps that do not provide for bypassing accommodate the larger flows because they are oversized, which adds significantly to the cost to build, install, and maintain them.

Another problem with many pollution traps is they simply filter the storm water at the natural flow rate of the storm water passing through it. The faster the storm water flows through the trap, the less particulate matter pollutants can settle in the trap. Some other traps detain the storm water for a brief time to allow some of the particulate matter to settle. But these traps only detain the water for a few minutes at most, and even a small water flow will cause the particles to be re-suspended in the water. Therefore, these pollution traps allow a lot of particulate matter pollutants to pass though them, even before bypass occurs.

In addition, the filtering systems of some pollution traps include screens for capturing miscellaneous debris. These screens are typically partially submerged in the water in the middle of the trap so that the debris is always floating in the water. Because the debris is always floating, it does not block the screen. The problem with this configuration is that vegetation, paper, and other absorbent miscellaneous debris tends to become waterlogged, rot, and deteriorate into smaller parts. These small parts then pass through the screen, are re-suspended in the water, and are carried out of the trap. Moreover, vegetative matter contains nitrogen and phosphorus and carries other pollutants such as fertilizer, pesticides, and oils. And paper products carry inks and other surface adherents. So now these additional pollutants also pass through the screen with the deteriorated debris and out of the trap.

Furthermore, spills of oil and/or other pollutants can be very damaging to the environment. Conventional oil-spill clean-up apparatus and methods have not proven completely satisfactory.

Accordingly, it can be seen that a need remains for a pollution trap that stays online and filters all the storm-water runoff from a parcel of land, without bypassing filtration or overflowing during larger-than-typical storms. In addition, there is needed a pollution trap that better induces settling of particulate matter and reduces waterlogging of absorbent miscellaneous debris, to provide improved filtration of pollutants from the storm water. Furthermore, a need exists for such a pollution trap that is cost-efficient to build, install, and maintain. Moreover, there is a need for such a pollution trap that is mobile and can be economically deployed to effectively clean up oil spills. It is to the provision of a pollution trap meeting these and other needs that the present invention is primarily directed.

SUMMARY OF THE INVENTION

The present invention provides an innovative trap for separating pollutants from water. The trap separates pollutants such as miscellaneous debris including vegetative matter, plastic, and paper, particulate matter including sand, grit, and clay, and/or floating matter including motor oil, other hydrocarbons, and detergents. In addition, the trap can be used to separate other pollutants from other liquids, as may be desired in a particular application.

One aspect of the present invention is a method of cleaning up a spill or the like of liquid or solid. The method includes the step of transporting a pollution trap to the site of the spill. The pollution trap is of the type having a main chamber, an inlet, an outlet, an upper compartment for holding lighter-than-water material, and is operative for settling heavier-than-water particulate matter out as water flows through the pollution trap from the inlet through the main chamber to the outlet. The method also includes the step of adding water to the spill to entrain the spill constituents in the water. The water containing spill constituents is then pumped into the inlet of the pollution trap to collect lighter-than-water spill material in the upper compartment and/or collect heavier-than-water spill material in the main chamber, the water passing through the pollution trap and out through the outlet. The method also includes transporting the pollution trap away from the site of the spill.

Preferably, the water pumped into and through the pollution trap is re-applied to the spill. Also preferably, the pollution trap is mounted to a vehicle and the step of transporting the pollution trap to the spill site involves moving the vehicle to the spill site. More preferably the vehicle is a truck or boat.

In another aspect the present invention comprises a mobile pollution trap. The mobile pollution trap is very effective for cleaning up difficult spills, such as of oil, gasoline, or other pollutants which are less or more dense than water. Generally described, the pollution trap is mounted for transport and includes a chamber and a collection reservoir with a skimming edge positioned between an inlet and an outlet of the chamber. The chamber has a floor, a worst storm water level when the water is flowing through the chamber at a maximum water flow rate, and an at-rest water level when none of the water is flowing into the chamber. The collection reservoir is configured to skim at least some of the floating matter or other pollutants into it.

In another exemplary embodiment, the pollution trap is designed to be stationary and is configured for separating pollutants from storm-water runoff. In this exemplary embodiment of the present invention, the collection reservoir has a skimming edge that is positioned at or adjacent the worst storm water level to skim floating pollutant matter into the collection reservoir. As the water flow through the chamber increases during larger-than-typical storms, the floating pollutants rise with the water level until they are skimmed off the surface of the water and into the reservoir, instead of bypassing the trap. In order to provide for adjusting the skimming edge for the maximum water flow at a particular installation, the skimming edge may be provided on a weir member that is vertically adjustable and mounted to a front wall of the collection reservoir.

Also, the bottom of the collection reservoir may be positioned above the chamber floor to permit the water to flow under the collection reservoir. In this way, which waterflow route through the chamber is lengthened to further encourage settling of some of the pollutants. And the chamber is divided into a front sub-chamber and a rear sub-chamber so that the storm water must flow upward to exit the chamber thereby inducing further settling of any particulate matter still carried by the water.

In addition, the collection reservoir can be used in combination with other filtration stages positioned in the chamber, including a screen, one or more baffles, and/or a pivotal filter. The screen is configured to suspend at least some of the miscellaneous debris or other pollutants above the at-rest liquid level. The baffles are configured to increase water residence time in the chamber to encourage settling of the particulate matter or other pollutants. And the pivotal filter is configured to filter out at least some of the clay or other pollutants.

The screen is positioned at or above the at-rest water level so that the screen retains some of the pollutants, allows the water to pass through it, and suspends the retained pollutants above the at-rest water level. In this way, the suspended retained pollutants are kept dry when there is no storm so that they do not waterlog, deteriorate, and pass through the screen. The screen can be, for example, basket-shaped but with an open side adjacent the inlet.

The baffles are each configured and positioned in the chamber to form at least one gap through which the water may flow around the baffle. In this way, the water flows around the baffles in a longer flow route through the chamber, without flowing any faster. Preferably, the collective flow area through the baffles is significantly greater than the flow area of the inlet to cause the linear speed of the flow to slow substantially while maintaining the volume of the flow constant. This increases the residence time of the water in the chamber, which encourages settling of some of the pollutants.

In addition, the baffles may have apertures in them that permit at least some of the liquid to pass through them. In this way, the apertured baffles disperse the water, which further encourages settling of some of the pollutants.

The pivotal filter pivots from a filtering position when a typical flow of the water is flowing through it toward a bypass position in response to a larger-than-typical flow of the water pushing against it. In this way, the pivotal filter stays in the filtering position during typical storms or between storms. But during larger-than-typical storms, the force of the water against the pivotal filter pushes it out of the way so that it does not impede the flow of the water out of the chamber. The pivotal filter may include, for example, a fibrous filtration member made of coconut fiber or another material for filtering clay or other particulate matter.

In this exemplary combination embodiment, the screen, baffle, reservoir, and pivotal filter filtration stages cooperate to provide a significant increase in performance over conventional pollution traps. In particular, the screen suspends at least some of the miscellaneous debris above the at-rest water level, the baffles increase water residence time in the chamber to encourage settling of the particulate matter, the collection reservoir skims at least some of the floating matter into it but allows the water to flow under it, and the pivotal filter filters out at least some of the suspended clay. It will be understood by those skilled in the art that these filtration stages can be used in this or other configurations for separating other pollutants from other liquids.

In another exemplary embodiment, the pollution trap is similar to one of the various forms of the first exemplary embodiment. But in this embodiment, the pollution trap is mobile and mounted onto a vehicle such as a truck or boat, which also carries a mobile trap operating system. The mobile trap operating system includes a pollution tank connected to the collection reservoir, a liquid tank connected to the pollution trap outlet, an output pump connected to the liquid tank, and an input pump connected to the pollution trap inlet. These connections are by hoses, pipes, tubing, conduit, or other liquid carrying members. A method for separating the pollutants from the water includes directing the water from the water tank at the pollutants and into a collection pool of polluted water, drawing the polluted water into the chamber, receiving the skimmed pollutants from the collection reservoir into the pollution tank, and receiving the pollutant-free liquid from the chamber into the liquid tank.

Accordingly, the pollution trap stays on-line and routes all the water through it, instead of bypassing or overflowing during larger-than-typical waterflows. In particular, the pollution trap reservoir collects floating hydrocarbons and particulate matter during larger-than-typical water flows, when more of these pollutants are carried by the water. Additionally, when the collection reservoir is used in combination with the screen, baffles, and pivotal filter, the pollution trap reduces waterlogging of absorbent miscellaneous debris and induces settling of particulate matter, thereby providing improved filtration of pollutants from the water. Moreover, the pollution trap can be provided in a mobile configuration in conjunction with a trap operating system for economical deployment to effectively clean up oil spills. Furthermore, the pollution trap is cost-efficient to build, install, and maintain.

These and other features and advantages of the present invention will become more apparent upon reading the following description in conjunction with the accompanying drawing figures.

BRIEF DESCRIPTION OF THE DRAWING FIGURES

FIG. 3 is an exploded perspective view of the screen of the pollution trap of FIG. 1, showing the major components of the screen.

FIG. 4 is a side view of the screen of FIG. 3.

FIG. 5A is a side view of a first alternative embodiment of the screen of the present invention, showing a screen that has a top.

FIG. 5B is a side view of a second alternative embodiment of the screen, showing a screen with a bottom that is angled.

FIG. 5C is a side view of a second alternative embodiment of the screen, showing a screen with a bottom that is curved.

DETAILED DESCRIPTION OF THE EXEMPLARY EMBODIMENTS

Figure 1:
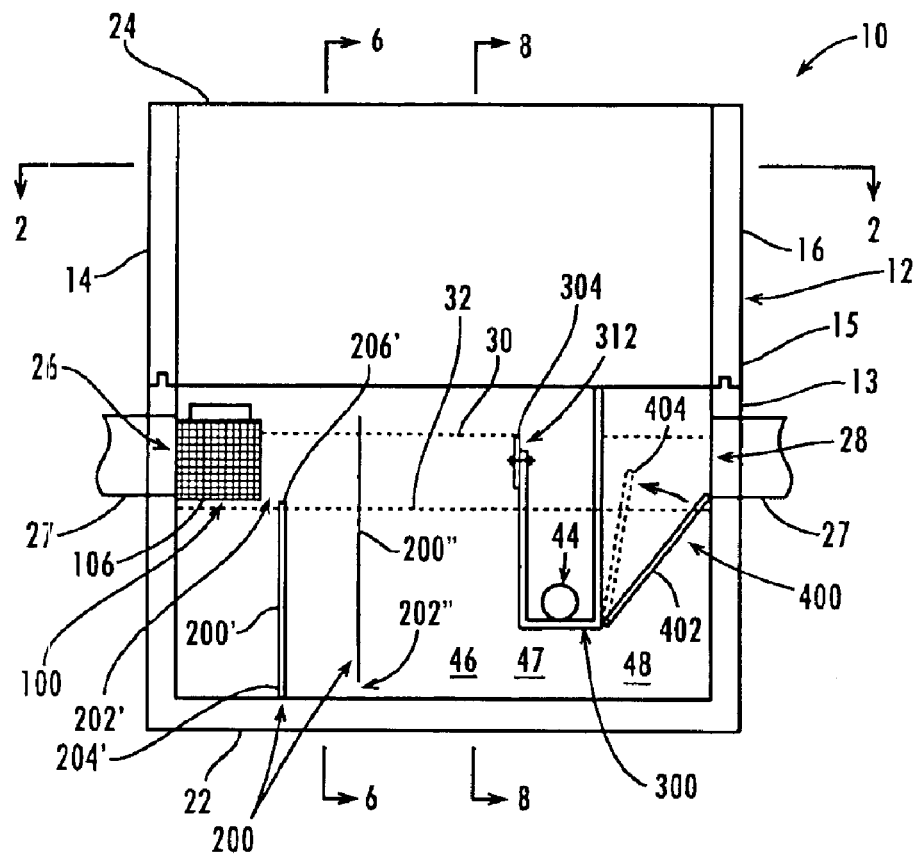
FIG. 1 is a side view of a pollution trap according to a first exemplary embodiment of the present invention, showing a chamber housing a screen, two baffles, a collection reservoir, and a pivotal filter.

Referring now to the drawing figures, wherein like reference numerals represent like parts throughout the several views, the pollution trap of the present invention provides for separating pollutants from water and retaining the pollutants in the trap or a nearby storage container. The pollution trap is well suited for filtering pollutants including floatable matter such as motor oil, other hydrocarbons, and detergents, particulate matter such as sand, dirt, and grit, and miscellaneous debris such as vegetative matter from trees, shrubberies, etc., paper and plastic trash, aluminum foil wrappers, foam cups, and so forth. In addition, a person of ordinary skill in the art could adapt the pollution trap described herein in order to separate other types of pollution or other types of matter from liquids other than water, if so desired.

The pollution trap of the present invention includes a collection reservoir for separating the hydrocarbons and other floatable pollutants from the water. The pollution trap may alternatively or additionally include a screen, baffles, and/or a pivotal filter. For illustration purposes, the trap will be described herein including the collection reservoir and these other filtration stages. It will be understood, however, that the trap can be provided with only the collection reservoir or with the collection reservoir in combination with these and/or other filtration stages selected to provide the pollutant separation desired in a particular application.

In addition, the present invention as described herein includes two exemplary embodiments, each with several variations. The first exemplary embodiment is configured for separating pollutants from storm-water runoff and the second exemplary embodiment is configured for cleaning up spills of oil or other pollutants. Those skilled in the art will understand that these and other embodiments of the invention can be used for these or other purposes, as may be desired.

Figure 2:
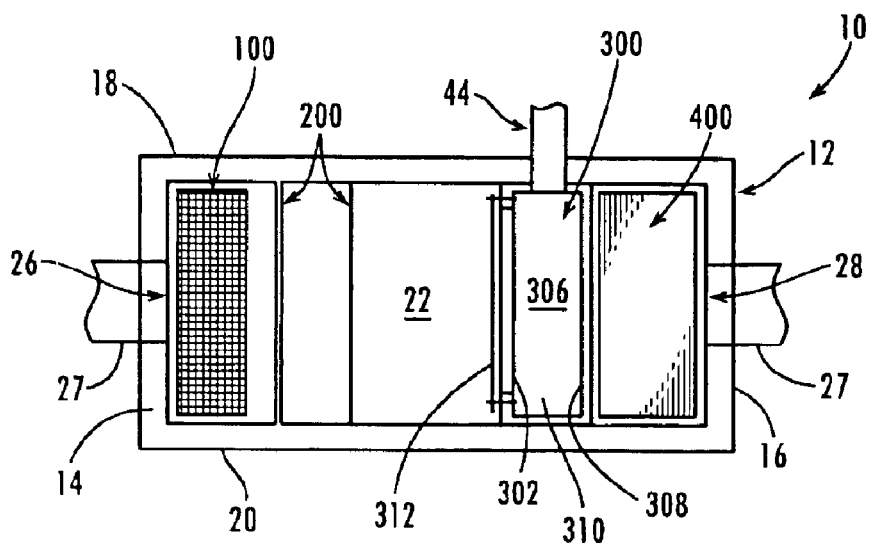
FIG. 2 is a cross-sectional view of the pollution trap of FIG. 1 taken at line 2—2.

FIGS. 1–2 show the first exemplary embodiment of the present invention, referred to generally as the pollution trap 10. The pollution trap 10 includes a chamber 12 that houses the screen 100, the baffles 200, the collection reservoir 300, and the pivotal filter 400. In a typical commercial embodiment, the screen 100 is positioned adjacent an inlet to the chamber 12, the baffles 200 are positioned between the screen and an outlet to the chamber, the collection reservoir 300 is positioned between the baffles and the outlet, and the pivotal filter 400 is positioned between the collection reservoir and the outlet. It will be understood that, while in the exemplary embodiment the pollution trap 10 includes all four of these filtration stages 100–400, in alternative embodiments such as those described below the present invention can be provided with only one of these stages or with various configurations and combinations of them in various other positions.

In the first exemplary embodiment, the chamber 12 is rectangular and is formed by end walls 14 and 16, sidewalls 18 and 20, a floor 22, and a lid 24. The chamber end walls 14 and 16, side walls 18 and 20, and floor 22 are made of reinforced concrete, and may be sealed with a coating such as a bituminous material for making the chamber watertight. The concrete chamber 12 is pre-cast and hauled to the installation location, though it could be cast on-site if so desired.

For convenience in constructing, hauling, and installing the chamber 12, it can be formed into two or more sections. For example, a base section 13 can be made with a standard size, and one or more riser sections 15 can be made in a variety of heights or custom-made per job. In this way, the height of the riser section 15 is selected so that the lid 24 will be at about ground level given the depth at which the base section 13 will be installed. In installations where the top of the base section 13 is at grade, no riser section 15 would be used. Alternatively, the chamber 12 can be integrally made as a single piece.

The lid 24 covers the open top of the chamber 12, and can be at least partially removable in order to provide ready access to the inside of the chamber for maintenance of the trap 10. For example, the lid 24 can be made of three steel panels, with a fixed middle panel and two end panels pivotally coupled to the middle one. Alternatively, the lid 24 can be made of concrete and include a steel manhole ring and cover. In addition, when the lid 24 and the chamber walls 14, 16, 18, and 20 are installed in areas where they are driven over, they can be sized and/or reinforced to withstand the traffic loadings they are subjected to.

Of course, the lid 24 and the chamber walls 14, 16, 18, and 20 can be made in other regular or irregular shapes and configurations, and can be made of other strong and durable materials, as may be desirable in a given application. For example, the chamber walls 14, 16, 18, and 20 could be made of fiberglass, hard plastic, or a composite, and/or the chamber 12 could be generally L-shaped or triangular with two inlets and one outlet.

Additionally, the chamber 12 has an inlet opening 26 in one of the end walls 14 through which the water flows into the chamber and an outlet opening 28 in the other end wall 16 through which the water flows out. The inlet 26 and the outlet 28 are sized and shaped to receive or otherwise connect to the pipes 27 of conventional storm sewer systems. If desired, the inlet 26 and the outlet 28 can include stub-outs for connecting to the conventional storm sewer pipes 27. The stub-outs can be provided by, for example, sections of metal or PVC pipe.

The inlet 26 and the outlet 28 are sized to handle a predetermined maximum flow rate based on the tributary area to be drained and the worst storm event the trap is intended to handle. For example, the maximum flow rate can be based on the 25-year storm (the worst storm over a 25-year period for the geographic location, on average), or for an otherwise-defined catastrophic or larger-than-normal storm. Of course, during most storms, the inlet 26 and the outlet 28 do not see anywhere close to the water flow intensity of the 25-year storm.

Furthermore, a worst storm (maximum) water level 30 is defined in the chamber 12 when the water is flowing through the chamber at the maximum waterflow rate, and an at-rest water level 32 when no water is flowing into it. More particularly, the at-rest water level 32 at its highest is at the bottom of the outlet 28, because the water cannot flow out of the chamber 12 when it is at this level. And, of course, the worst storm water level 30 is higher than the at-rest water level 32. Moreover, because the worst storm water level 30 is defined by the water level during the worst storm event, it is determined at least in part by the size of the inlet 26, the outlet 28, and the chamber 12.

In a typical commercial embodiment, the chamber is 11 feet high (6 foot base plus 5 foot riser), 5 feet wide, and 10 feet long, with 6 inch thick walls. And the inlet and the outlet are 15 inch openings positioned about 4 feet above the chamber floor, with the bottom of the outlet positioned about 0.1 foot lower than the bottom of the inlet. With these dimensions, the trap can successfully handle (without overflowing or bypassing) about 9.2 cubic feet per second (cfs), which is greater than the volume flow rate for the 25-year storm for a typical installation with a 1 acre tributary area. At this flow rate, the vertical exit velocity is about one foot per second, which is slow enough to retain particles larger than 20 microns in the pollution trap. For comparison, many conventional traps bypass at only 1 to 2 cfs, which often occurs during a typical "first flush" storm event.

It will be understood that many variations of these dimensions may be used, depending on the size, grade, ground covering, and use of the tributary area to be drained, the typical and maximum rainfall during the design worst storm event, the local restrictions on flow rates, any physical space limitations for the pollution trap, and so forth. For example, in some other embodiments, the inlet and the outlet are provided by 18 or 24 inch openings for handling greater maximum flow rates, and the chamber riser section is only 2 or 3 feet high where the base section is installed closer to grade.

To put it more succinctly, the inlet 26 and the outlet 28 are designed to handle the predetermined maximum flow rate of storm water for a maximum design storm event, for example, the 25-year storm. This typically means matching the inlet 26 and the outlet 28 to the size of the storm sewer pipe, whether preexisting or new. If the storm sewer pipe is under pressure, then the inlet 26 may be sized larger to slow down the water flow as it enters the chamber 12. And the outlet 28 may be the same size as the inlet 26 or larger. In any event, the chamber 12 is designed so that all of the water that can be delivered into it from the inlet 26 can pass through it and out of the outlet 28. Finally, the filter stages 100, 200, 300, and 400 are configured so that they permit passing through the chamber 12 of the maximum water flow during the maximum design storm event, so the reservoir 300 does not overflow and the trap 10 does not need to be bypassed.

Referring now to FIGS. 1–4, the screen 100 catches most to all of the floating miscellaneous debris such as vegetative matter, plastic, and paper that might otherwise collect in the chamber 12 and/or be washed over into the reservoir 300. To filter the storm-water as it enters the chamber 12, the screen 100 is positioned adjacent the inlet 26 and flush against the end wall 14. Also, the screen 100 is vertically positioned at or just above the at-rest water level 32, and thus at or just below the bottom of the inlet 26.

In this position, during a storm the screen 100 collects and retains the debris as it enters the chamber 12, allows the water to pass through it, and suspends the retained debris above the at-rest water level 32. After the storm, the water level drops down to the at-rest water level 32, so the debris is suspended in the air and can now dry out. In this way, the suspended debris does not become waterlogged, break down into smaller pieces, and wash through the screen 100. And the nitrogen, phosphorus, fertilizer, pesticides, oils, inks, surface adherents, and other pollutants contained in or carried by vegetative matter and paper also remain trapped by the screen 100. The result is a significant increase in the amount of debris and other pollutants retained over time by the screen 100 relative to conventional traps.

In addition, as the debris builds up on the screen 100 overtime, it tends to mat together, particularly the leaves and other vegetative matter. This matted debris then creates a natural filter on the screen 100 that provides additional levels of filtration. The way it works is the matted debris begins to stop larger gravel and sand particles. These particles fill the spaces in the matted debris and, in a "beaver dam" effect, cause smaller particles to be trapped. The result is that very fine particles, pollen, mud, sand, etc., are collected in the built-up layers of the matted debris on the screen 100. And these particles are often retained there because the water flow through the trap 10 is normally not very great. That is, typical storms often produce a water flow only few inches deep through the inlet 26, very often amounting to barely a trickle. So the particles trapped by the matted debris are often retained there and not washed away through the screen 100.

Furthermore, the screen 100 preferably extends all the way across the chamber 12. That is, the ends of the screen are adjacent the sidewalls 18 and 20 of the chamber. With the screen 100 being long relative to the diameter of the inlet 26, as the storm-water enters the chamber 12 it is free to disperse laterally. The dispersing and screening of the water by the screen 100 tends to break up any organized eddies and vortices. This encourages settling of the particulate matter pollution within the chamber 12.

Turning now to the construction of the screen 100, in a typical commercial embodiment it is basket-shaped but with an open side 101 that is adjacent the inlet 26 for allowing the debris into the chamber 12. The generally basket-shaped screen 100 is provided by a rigid frame 102 that holds a liner 104. The frame 102 is made of aluminum grating and has a bottom 106, a side 108, and ends 110. The liner 104 is made of aluminum ¼ inch mesh and has a bottom 112, a side 114, and ends 116. Accordingly, the frame bottom 106 and the liner bottom 112 are positioned at or above the at-rest water level 32.

For ease of removing the trapped debris and particles from the screen 100, it is provided with handles 118 and removably mounted in the chamber 12. For example, the screen 100 can be supported on mounting structures 120 such as mounting brackets, pins, bolts, or other mounting structures. The mounting structures 120 support the screen 100 and restrain it from lateral or downward movement, but permit removal of the screen by lifting it from the brackets. Thus, the screen 100 does not have to be decoupled from the mounting structures 120 for its removal from the chamber 12.

Alternatively, the screen 100 can be made in other shapes, sizes, and materials, and be positioned elsewhere in the chamber 12. For example, the liner can be made of 1/16 or 1/8 inch mesh, perforated panels, lattice structures, or other structures with filtering spaces, made of stainless steel, plastic, a composite, or another material, and constructed without ends and/or extending only part of the way across the chamber. Or the liner can be eliminated and the screen provided with the smallest desired filtering spaces in the frame instead of in the liner. And the frame can be provided a structure other than grating but still having openings in it, made of stainless steel or another suitable material, and constructed without the ends and/or extending only part of the way across the chamber.

FIGS. 5A–5C depict several alternative embodiments of the screen. In a first alternative embodiment shown in FIG. 5A, the screen 100a has a bottom 106a and a side 108a, and additionally includes a top 122a. In a second alternative embodiment shown in FIG. 5B, the screen 100b has a bottom 106b that is angled. And in a third alternative embodiment shown in FIG. 5C, the screen 100c has a bottom 106c that is curved. These embodiments can be provided with or without ends, which are not shown in the respective drawings. It will be understood that the screen can be provided in alternatively-configured embodiments not described herein but that provide the same above-described advantages.

Figure 6:
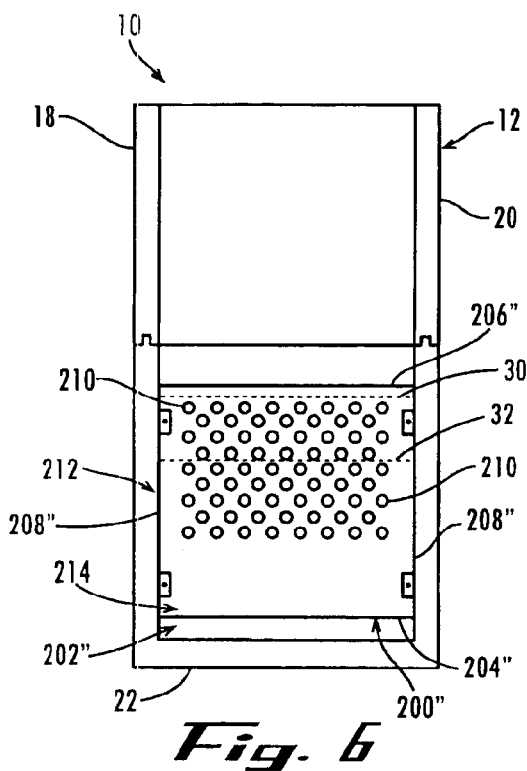
FIG. 6 is a cross-sectional view of the second baffle of the pollution trap of FIG. 1 taken at line 6—6, showing the major components of the second baffle.

Referring now to FIGS. 1, 2 and 6, each one of the baffles 200 is configured and positioned in the chamber 12 to form at least one gap 202 through which the water can flow to get around the baffle. So instead of the water naturally flowing straight through the chamber 12, it is diverted around the baffles 200 through the gaps 202. The diverted flow of the water around the baffles 200 results in a longer flow route through the chamber 12. Also, the water flows past the baffles 200 no faster than when it entered the chamber 12, as described in detail below. Because the water travels the longer route around the baffles 202 but is not throttled, the water resides in the chamber 12 for a longer time. This increased water residence time encourages the particulate matter carried by the water to settle to the floor 22 of the chamber 12.

The position, configuration, and number of the baffles 200 and the gaps 202 formed by them are selected depending on the water residence time desired for a particular installation. For example, in the presently described embodiment, two baffles 200' and 200" are provided. The first baffle 200' has a bottom 204' positioned at the chamber floor 22 and a top 206' positioned below the worst storm water level 30. In this position, a top gap 202' is formed between the baffle top 204' and the worst storm water level 30 to encourage the water to flow over the baffle 200'. The baffle top 204' may be positioned at the at-rest water level 32 so that the water begins flowing over it at the outset of storm water flowing into the chamber 12. Or the baffle top 204' may be positioned higher, closer to the worst storm water level 30, so that the water only begins flowing over it sometime after the storm has begun or only during larger storms.

The second baffle 200", which is shown in FIG. 6, has a bottom 204" that is positioned above the chamber floor 22 and a top 206" that is positioned at or above the worst storm water level 30. In this position, a bottom gap 202" is formed between the baffle bottom 204" and the chamber floor 22 to encourage the water to flow under the baffle 200″. But the water cannot flow over the baffle top 206″, at least not during typical storms or larger-than-typical storms up to the worst storm event.

In addition, the first baffle 200′ has sides 208′ and the second baffle 200″ has sides 208″, with the sides 208′ and 208″ preferably extending substantially all the way across the chamber 12. That is, the baffle sides 208′ and 208″ are positioned at the sidewalls 18 and 20 of the chamber 12. In this position, the water can not flow around the baffle sides 208′ and 208″, but instead is forced to flow up over the first baffle top 206′ through the gap 202′ and then down under the second baffle bottom 204″ through the gap 202″. Thus up-and-down water flow produces the longer flow route and increased residence time of the water in the chamber 12.

As used herein, the second baffle top being positioned "at" the worst storm water level is intended to include being positioned adjacent to but just below the worst storm water level. And the first baffle bottom being positioned "at" the chamber floor is intended to include being positioned adjacent to but just above or recessed down into the chamber floor. Also, the sides of the baffles being positioned "at" the chamber sidewalls is intended to include being positioned adjacent to but spaced slightly from or recessed into the chamber sidewalls.

Furthermore, one or both of the baffles 200 may be provided with apertures 210 in them. The apertures 210 permit some of the water and the pollutants carried by it to pass through the baffles 200. When some of the water flows through the apertures 210 while the rest of the water is impeded by the baffles 200, the water flow tends to disperse and breakup any organized eddies and vortices. As with the screen 100, this encourages settling of the particulate matter in the chamber 12.

Also, some of the oil and/or other floating matter may be forced below the water surface upon entering the chamber 12, and the water flow dispersal provides sometime for it to rise back to the water surface. In addition, the apertures 210 permit the floating matter to pass through them. Accordingly, the first baffle 200′ has the apertures 210 along all or much of its height, with lower apertures for permitting the temporarily submerged floating matter through and upper apertures for permitting the remaining floating matter through. Similarly, the second baffle 200″ has apertures 210 in its upper portion 212 for permitting the floating matter through. But to encourage the water to flow down through the lower gap 202″, and because by now most to all of the floating matter has returned to the water surface, the lower portion 212 of the second baffle 200″ need not have any apertures 210.

As mentioned above, the water flows past the baffles 200 no faster than when it entered the chamber 12. This is because for each of the baffles 200′ and 200″, the combined cross-sectional area of the gap around it and the apertures in it is larger than or equal to the cross-sectional area of the inlet 26. For example, in a typical commercial embodiment, the cumulative area of the baffle gap and apertures is three to five times greater than the inlet area. In this way, the water flows freely into the chamber 12 at the inlet 26 and is not throttled as it passes around the baffles 200. Instead, the water slows down in the chamber 12, or at least is allowed to continue no faster than its inlet flow rate, to encourage the particulate matter to settle.

Turning now to the construction of the baffles 200, in a typical commercial embodiment they are provided by panels that are generally flat and made of aluminum, stainless steel or another metal. The width of each of the gaps in the panels is at least about 3 inches. The diameter of the apertures is 1 inch, arranged in an array on 1-¼ centers. The lower portion of the panel with no apertures is about 15″ high. The panels are mounted in the chamber by conventional mounting structures such as mounting brackets, pins, bolts, or other mounting structures. In this configuration, the water flow rate through the trap is kept under about 1.0 feet per second even during the maximum storm event, which is slow enough to enable the trap to collection about 2 inches of particulate matter in typical installations.

Alternatively, the baffles may be provided by panels that are curved, zigzagged, corrugated, L-shaped, have a combination of these profiles or shapes, or are otherwise configured. Also, the baffles may be made of fiberglass, plastic, a composite, or another material. The size, number, and position of the gaps and the apertures may vary and be selected to provide the water flow dispersion, route, and rate desired for a particular installation. Accordingly, sometimes only one baffle is provided, and other times more than two are used. In some installations, each or particular ones of the baffles have gaps formed at both the top and the bottom, at one or both sides, all the way around them, and/or at intervals in a serrated or scalloped configuration, or otherwise. In addition, the apertures may be arranged in an array with a regular pattern or an irregular arrangement. And some of the apertures may be larger than other ones. Furthermore, the baffles may be configured and positioned primarily for dispersing the water, primarily for lengthening the flow route through the chamber, or both.

Figure 7A:
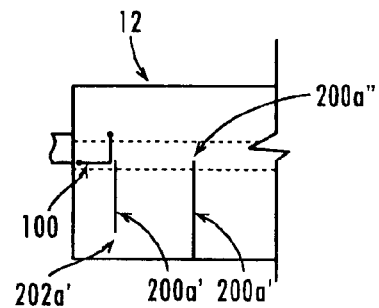
FIG. 7A is a side view of a first alternative embodiment of the baffles of the present invention, showing a first baffle mounted to the screen and having a bottom gap, and a second baffle having a top gap.
Figure 7B:
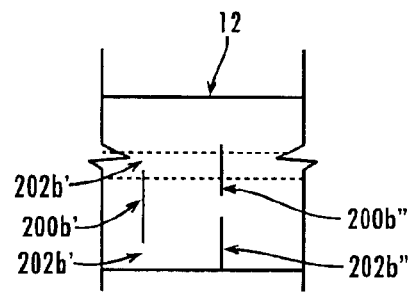
FIG. 7B is a side view of a second alternative embodiment of the baffles, showing a first baffle having both top and bottom gaps and a second baffle having an intermediate gap.
Figure 7C:
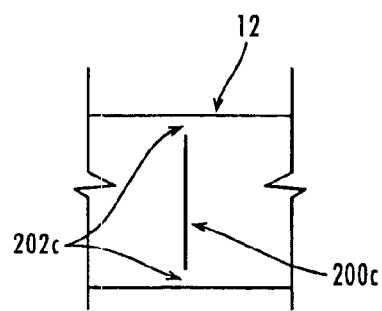
FIG. 7C is a plan view of a third alternative embodiment of the baffle, showing a single baffle having side gaps.
Figure 7D:
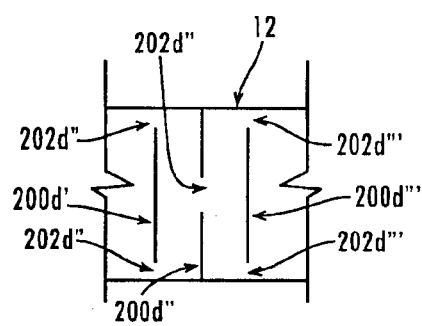
FIG. 7D is a plan view of a fourth alternative embodiment of the baffles, showing a first baffle having side gaps, a second baffle having an intermediate gap, and a third baffle having side gaps.

FIGS. 7A–7F depict several alternative embodiments of the baffles. FIGS. 7A and 7B are elevation views showing alternative top and/or bottom baffle gap configurations, while FIGS. 7C–7D are plan views showing side gap configurations.

In a first alternative embodiment of the baffles shown in FIG. 7A, the first baffle 200*a*′ is coupled to the screen 100 so that it does not need to be mounted to the chamber 12. Also, the first baffle 200*a*′ has bottom gap 202*a*′ so that the water flows under it, and the second baffle 200*a*″ has top gap 202*a*″ so that the water then flows back up over it.

In a second alternative embodiment shown in FIG. 7B, the first baffle 200*b*′ has both bottom and top gaps 202*b*′ so that the water flows both under and over it. And the second baffle 202*b*″ has an intermediate gap 202*b*″ between its top and bottom, for example, along its horizontal centerline, through which the water flows. In this configuration, the gap 202*b*″ may be provided by a slot in the second baffle or two separate panels may be provided to form the second baffle.

In a third alternative embodiment shown in FIG. 7C, only one baffle 200*c* is provided, and it has side gaps 202*c* formed vertically at its sides 208*c*. In this configuration, the water is diverted around the sides 208*c* of the baffle 200*c*.

In a fourth alternative embodiment shown in FIG. 7D, the first baffle 200*d*′ and a third baffle 200*d*′″ have side gaps 202*d*′ and 202*d*′″, and the second baffle 202*d*″ has an intermediate gap 202*d*″. In this configuration, the water flows around the sides of the first baffle 200*d*′ through the first gaps 202*d*′, inward toward the center of the chamber 12, through the intermediate gap 202*d*″ between the sides of the second baffle 200*d*″, back outward toward the sides of the chamber 12, and around the sides of the third baffle 200*d*′″ through the third gap 202*d*′″.

Figure 7E:
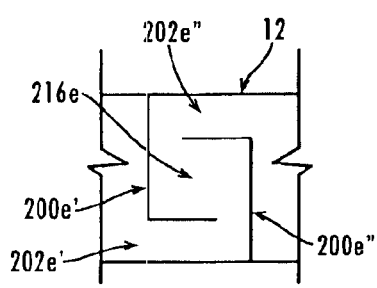
FIG. 7E is a plan view of a fifth alternative embodiment of the baffles, showing two L-shaped and opposing baffles.

In a fifth alternative embodiment shown in FIG. 7E, the first baffle 200*e*′ and the second baffle 202*e*″ are generally L-shaped and opposing each other to form side gaps 202*e*′ and 202e'' and an intermediate channel 216e. In this configuration, the water flows around one side of the first baffle 200e' through the first gap 202e', reverses direction and flows back toward the first baffle through the intermediate channel 216e, then reverses direction again and flows through the second gap 202e''.

Figure 7F:
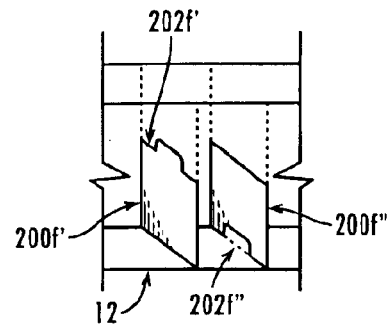
FIG. 7F is a perspective view of a sixth alternative embodiment of the baffles, showing a first baffle having top corner gaps and a second baffle having a bottom intermediate gap.
Figure 8:
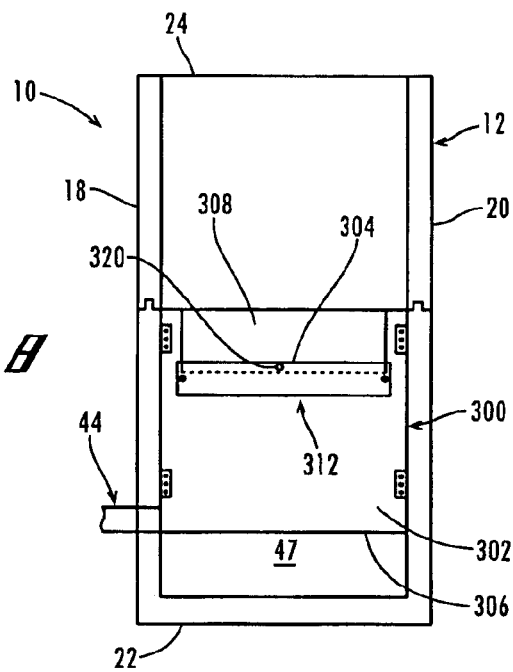
FIG. 8 is a cross-sectional view of the collection reservoir of the pollution trap of FIG. 1 taken at line 8—8, showing the major components of the collection reservoir.
Figure 9:
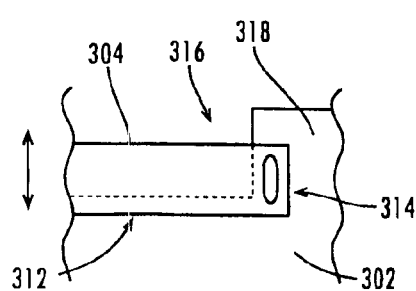
FIG. 9 is a detail view of a portion of the collection reservoir of FIG. 8, showing a weir adjustably mounted to a front wall of the reservoir.

In a sixth alternative embodiment shown in FIG. 7F, the first baffle 200f has top corner gaps 202f and the second baffle 202f'' has a bottom intermediate gap 202f''. In this configuration, the water flows upward and laterally to the sides of the chamber 12, over the first baffle 200f through the top corner gaps 202f', back downward and toward the center of the chamber 12, and under the second baffle 200f'' through the bottom intermediate gap 202f''. It will be understood by those skilled in the art that other configurations, positions, numbers, and sizes of the baffles can be provided to accomplish the above-stated functions of dispersing the water flow and increasing the water residence time.

Referring now to FIGS. 1, 2, 8, and 9, the collection reservoir 300 has a front wall 302 and a skimming edge 304 positioned at the worst storm water level 30, or at a selected storm water level for a lesser storm event to allow oil collection at that selected level. The skimming edge 304 skims into the reservoir 300 at least some of the oil and/or other pollution floating on the surface of the water. And at least the portion of the front wall 302 below the at-rest water level 32 extends all the way across the chamber 12, so the water cannot flow around the sides of the reservoir 300. So instead of the floating matter flowing through and out of the chamber 12 on the water surface, it is skimmed into the reservoir 300 and thereby segregated from the water.

In addition, the collection reservoir 300 divides the chamber 12 into a front sub-chamber 46 and a rear sub-chamber 48. The sub-chambers 46 and 48 provide pools with sufficient depths to encourage settling of the particulate matter, and are in fluid communication through a gap 47. The rear sub-chamber 48 has a cross-sectional area larger than that of the inlet so that the water flows slower through it. In this way, the particulate matter flows under the collection reservoir 300 through the reservoir gap 47, then back up through the rear sub-chamber 48 and out of the chamber 12 through the outlet 28. Because of this longer flow route, because the water is flowing slower, and because of the gravitational forces on the particulate matter as the water decelerates up through the rear sub-chamber 48 to get out of the chamber 12, more of the particulate matter settles to the chamber floor 22 instead of flowing out of the trap 10.

The reservoir gap 47 is defined by a bottom wall 306 of the collection reservoir 300, the floor 22 of the chamber 12, and the chamber sidewalls 18 and 20, to allow the water to flow under the reservoir. In order to keep the water from flowing any faster than when it entered the chamber 12, the cross-sectional area of the reservoir gap 47 is the same as or larger than the cross-sectional area of the inlet 26. Preferably, the water is slowed by sizing the reservoir gap 47 larger than the area of the inlet 26, for example, by a factor of about three to five. By keeping the flow rate relatively slow, more of the particulate matter will settle in the chamber 12.

In the first exemplary embodiment, the collection reservoir 300 is formed by the front wall 302, a rear wall 308, sidewalls 310, and the bottom wall 306 extending between them. For standardized traps, the skimming edge 304 can be defined on the front wall 302 or another component of the reservoir 300. To provide for adjustability for site-specific conditions, however, the skimming edge 304 can be defined by the top of a weir member 312 that is adjustably mounted to the front wall 302 or another part of the reservoir 300.

The weir 312 is preferably adjustably mounted to the front wall 302 by bolt-and-slot assemblies 314. Alternatively, another suitable mounting may be used instead. For example, the front wall and the weir may be provided with a series of holes that can be selectively aligned for receiving a bolt (with unused holes plugged), or the weir can slide on a track, in a channel, or otherwise.

In addition, the front wall 302 has an opening 316 in it, and the weir 312 is vertically adjustable to cover all or some of the opening. The opening 316 is formed between two side tabs 318 of the front wall 312, and the weir overlaps with and is adjustably mounted 314 to the side tabs.

Also, the collection reservoir 300 may be provided with a maintenance opening and removable plug assembly 320 positioned below the skimming edge 304. For example, the opening and plug assembly 320 may be provided in the front wall 302 and/or in the weir member 304. The opening and plug assembly 320 may include a conventional plug receivable in the opening, a swivel plate movable to expose or block the opening, or another structure for selectively exposing and blocking the opening. For installations that process substantial amounts of floating matter, a thick blanket of it builds up during typical storms because the water level does not get high enough for it to be skimmed into the reservoir. During maintenance visits, the plug can be moved to drain the blanket of floating matter into the reservoir 300.

After the floating matter has been skimmed or drained into the collection reservoir 300, it can be held there or drained out of the chamber 12 through a drain pipe 44. For example, one or more storage containers (not shown) made of concrete, metal, composites, or another material may be provided beside or some distance from the trap 10 and connected to it by the drain pipe 44.

In a typical commercial embodiment, the collection reservoir 300 is made of a rectangular metal box that is mounted to the chamber sidewalls 18 and 20. Also, the opening 316 is in the shape of a horizontally elongate notch, and the weir 314 is provided by a horizontally elongate steel plate. For typical inlet and chamber sizes, the reservoir bottom wall is positioned about 1½ feet above the chamber floor so that the cross-sectional area of the reservoir gap is three to five times larger than the inlet. And the cross-sectional area of the rear sub-chamber is about eight to ten times larger than the inlet. In this configuration, the water flow rate through the trap is kept under about 1.0 feet per second even during the maximum storms event, which is slow enough to enable the trap to collection about 2 inches of particulate matter in typical installations.

Alternatively, the collection reservoir and its components may be provided in other regular or irregular shapes. For example, the collection reservoir can be triangular or have a front wall and/or weir that is curved, corrugated, zigzagged, or otherwise configured so that the skimming edge is longer to produce increased skimming of the floating matter. Similarly, the skimming edge may have a profile (when looking from the front) that is linear, serrated, has a series of notches, or that is otherwise configured. Also, the opening can be in the shape of a horizontal slot, a hole, or another-shaped opening with an upper portion of the front wall extending above it. In addition, the reservoir gap and the rear sub-chamber can be configured in other sizes and shapes selected for the site conditions. And instead of the collection reservoir being an open-top box, the reservoir sidewalls can be eliminated and the reservoir front, rear, and bottom walls mounted directly to the chamber sidewalls.

Figure 10A:
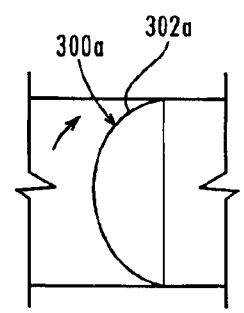
FIG. 10A is a plan view of a first alternative embodiment of the collection reservoir of the present invention, showing a collection reservoir with a curved front wall.

FIGS. 10A–10E depict several alternative embodiments of the collection reservoir. FIG. 10A is a plan view, while FIGS. 10B–10E are side views.

In a first alternative embodiment shown in FIG. 10A, the collection reservoir 300a has a curved front wall 302a. In this way, the skimming edge is longer, so more floating matter can be skimmed into the reservoir 300a during larger-than-typical storms.

Figure 10B:
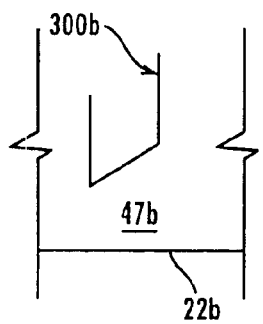
FIG. 10B is a side view of a second alternative embodiment of the collection reservoir, showing a collection reservoir forming a tapered gap.

In a second alternative embodiment shown in FIG. 10B, the collection reservoir 300b forms a tapered gap 47b that is larger closer to the rear of the reservoir than at the front of it. In this way, the water slows as it approaches the chamber outlet, so the particulate matter carried by the water loses momentum just as the water begins to flow up toward the outlet, which encourages the particulate matter to settle to the chamber floor 22b.

Figure 10C:
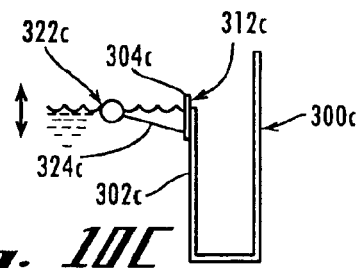
FIG. 10C is a side view of a third alternative embodiment of the collection reservoir, showing a float for automatically adjusting the weir.

In a third alternative embodiment shown in FIG. 10C, the collection reservoir 300c includes a float 322c for automatically adjusting the weir 312c. The float 322c is coupled to the weir 312c by, for example, a rigid member 324c. And the weir 312c is mounted to the front wall 302c so that it can slide up and down, without leaking. The float 322c may be provided by a hollow or low-density ball, a gas-filled shell of a lightweight but durable material such as plastic, or by another buoyant structure that will float on the water surface. The construction of the float 322c and its coupling to the weir 312c are selected so that float positions the skimming edge 304c of the weir at about the water level. During typical storms with water levels below the worst storm water level, the float 322c and the weir 312c automatically adjust downward to the lower water level so that the collection reservoir 300c skims the floating matter even at these lower flows. And, of course, as the water level rises, the float 322c rises with it to automatically keep the weir 312c at the then-current water level. In this way, the collection reservoir 300c is skimming the floating matter whenever there is a flow of water through the chamber.

Figure 10D:
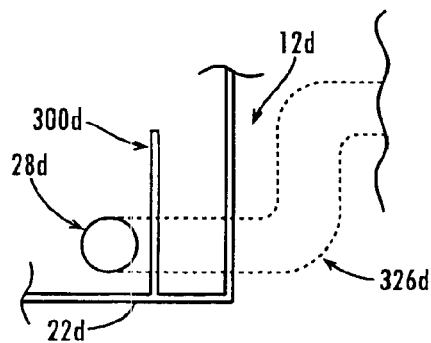
FIG. 10D is a side view of a fourth alternative embodiment of the collection reservoir, showing a collection reservoir that extends to the chamber floor.

In a fourth alternative embodiment shown in FIG. 10D, the collection reservoir 300d is at the rear of the chamber 12d and extends to the chamber floor 22d, the outlet 28d is in the one of the chamber sidewalls, and a riser pipe 326d extends from the outlet 28d. And in a fifth alternative embodiment shown in FIG. 10E, the collection reservoir 300e is at the rear of the chamber 12e, the outlet 28e is below the reservoir, and a riser pipe 326e extends from the outlet 28e. The fourth and fifth alternative embodiments 300d and 300e can be used in applications where there are very tight space limitations and/or where oil separation is the primary objection and particulate settling is not as important.

Figure 11:
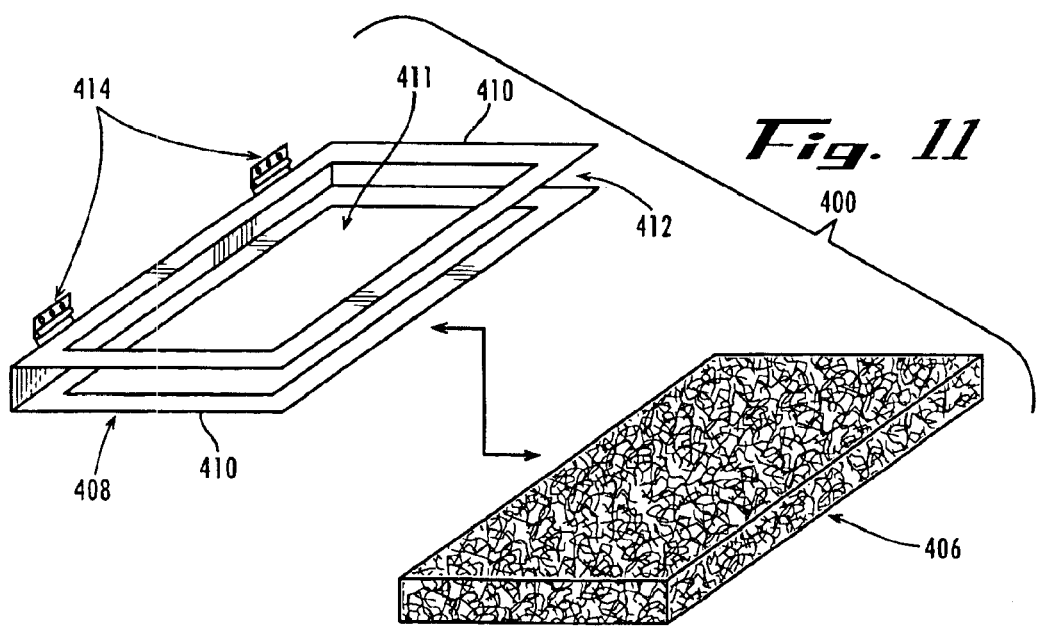
FIG. 11 is an exploded perspective view of the pivotal filter of the pollution trap of FIG. 1, showing a frame holding a fibrous filtration member.

Referring now to FIGS. 1, 2, and 11, the pivotal filter 400 pivots from a filtering position 402 when a typical flow of the water is flowing through the chamber 12 toward a bypass position 404 during a larger-than-typical water flow. During a typical flow of the water through the chamber 12, the weight of the pivotal filter 400 urges it down into the filtering position 402. In the filtering position 402, at least part of the pivotal filter 400 is at or below the at-rest liquid level 32 so that when the water flows through the chamber 12, all or most all of the water passes through and is filtered by the pivotal filter.

But as the water flow increases during a larger-than-typical storm, the flowing water pushes the filter 400 pivotally out of the way toward the bypass position 404 to allow some-to-all of the water to bypass it. In the bypass position 404, the pivotal filter 400 is pivoted upward enough so that the water flow rate is not reduced during the worst storm event. For example, during the worst storm event, the pivotal filter 400 may need to pivot enough out of the way that it does not filter any water, or it may only need to pivot far enough out of the way to allow only some of the water to bypass the filter, with some of the water still filtering though it. In any event, the pivotal filter 400 filters the water during typical storms, but does not reduce the water flow rate through the chamber 12 during the worst storm event for which the trap 10 is intended. And as the storm water flow subsides, the pivotal filter 400 pivots back down toward the filtering position 402 under its own weight.

In addition, the pivotal filter 400 preferably extends substantially all the way across the chamber 12. That is, the ends of the pivotal filter 400 are positioned adjacent to the sidewalls 18 and 20 of the chamber 12. In this configuration, none or only very little of the water can flow around the ends of the pivotal filter 400 and out of the chamber 12.

Turning now to the construction of the pivotal filter 400, in a typical commercial embodiment it is provided by a filtration member 406 that is supported by a frame 408. For example, the filtration member 406 may be made of a ¼ inch thick slab of coconut fiber for filtering clay particulate matter. Alternatively, the filtration member 406 may be made of another material with another shape and/or size for filtering another pollutant.

The frame 408 has peripheral frame members 410 for supporting the filtration member 406 and defining a filtering opening 411. In addition, the frame 408 has at least one open side 412 through which the filtration member 406 can be removed and through which a replacement one can be reinserted. Alternatively, the frame 408 can enclose all the filtration member 406 sides, with the frame and the filtration member being replaced together when needed.

In addition, the pivotal filter 400 is pivotally coupled within the chamber 12 by one or more pivotal couplings 414 such as hinges at one end of the pivotal filter. The pivotal couplings 414 may be connected to the collection reservoir 300, the chamber sidewalls 18 and 20, or to another component of the pollution trap 10. For example, the pivotal filter 400 may be hinged to the rear or bottom wall of the collection reservoir 300. Or it can pivot on horizontal pins that extend into the chamber sidewalls 18 and 20. And the other end of the pivotal filter 400 may be positioned so that it leans against the end wall 28 of the chamber 12, below the outlet 28.

Figure 10E:
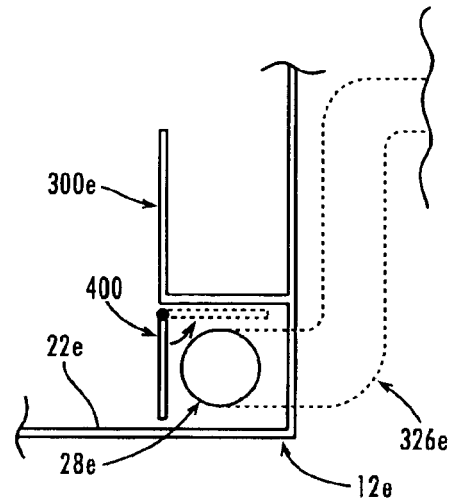
FIG. 10E is a plan view of a fifth alternative embodiment of the collection reservoir, showing a collection reservoir with the outlet positioned under it.
Figure 12:
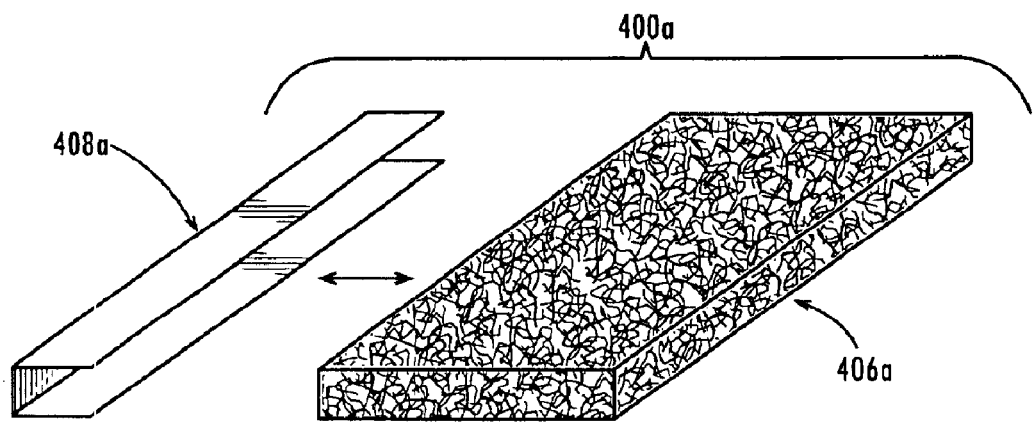
FIG. 12 is an exploded perspective view of a first alternative embodiment of the pivotal filter of the present invention, showing the frame provided by a channel that holds the fibrous filtration member.

The size, shape, configuration, and pivotal coupling position of the pivotal filter 400 are selected depending on the particular application. For example, in a first alternative embodiment of the pivotal filter shown in FIG. 12, the filter 400a includes a frame 408a provided by a channel that receives the filtration member 406a. In other alternative embodiments, the pivotal filter is positioned under the collection reservoir (as shown in FIG. 10E), is provided without a frame, is provided with a differently configured frame, and/or extends only part of the way across the chamber.

Figure 13:
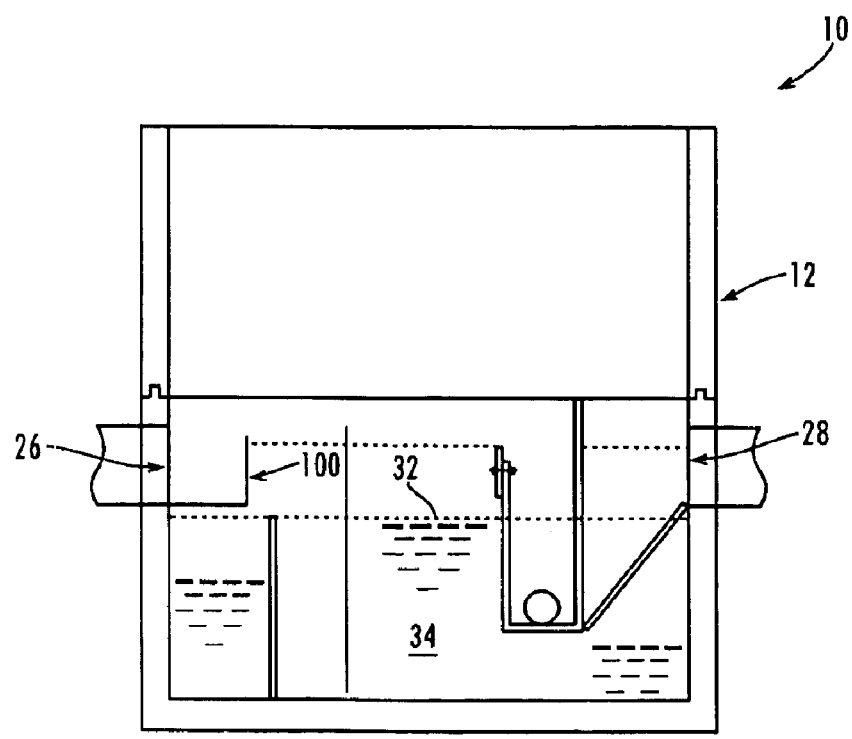
FIG. 13 is a schematic diagram of the pollution trap of FIG. 1, showing the pollution trap at-rest when no water is flowing into the chamber.
Figure 14:
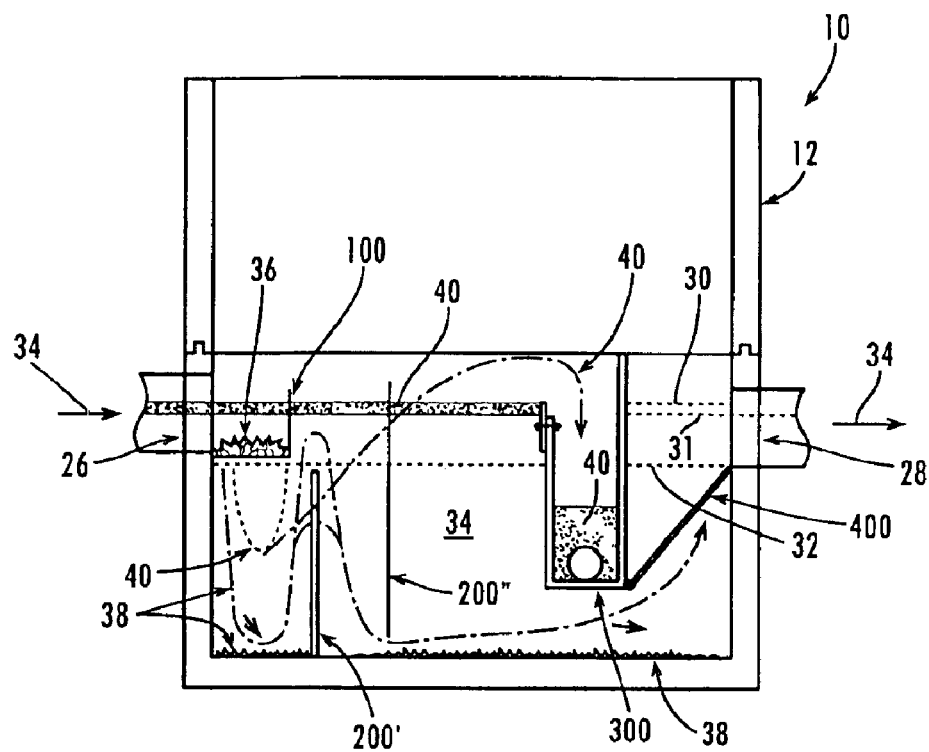
FIG. 14 is a schematic diagram of the pollution trap of FIG. 1, showing the operation of the pollution trap during a typical storm event with a typical waterflow rate into the chamber.
Figure 15:
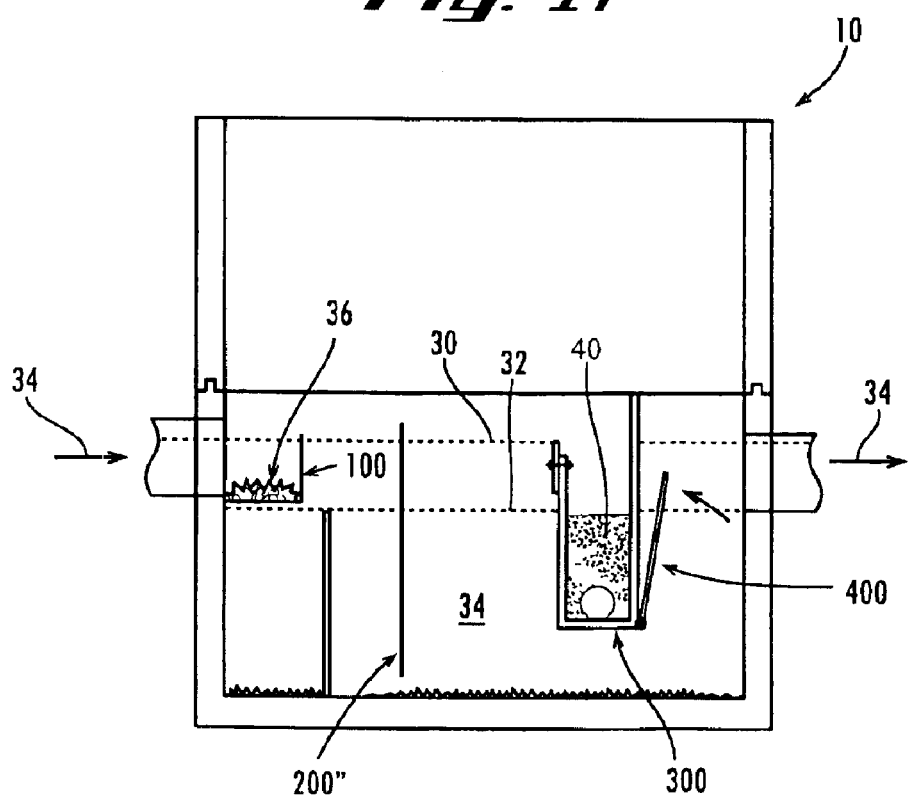
FIG. 15 is a schematic diagram of the pollution trap of FIG. 1, showing the operation of the pollution trap during a worst storm event when a predetermined maximum water flow is flowing into the chamber.

Referring now to FIGS. 13–15, the operation of the pollution trap 10 of the first exemplary embodiment will now be described. FIG. 13 depicts the pollution trap 10 in the at-rest state, when no water 34 is flowing into or out of the chamber 12. In this state, the at-rest water level 32 is defined at the bottom of the outlet 28, because no more water 34 can flow out of the chamber 12. Because the screen 100 is above the at-rest water level 32, any miscellaneous debris in the screen from previous storms dries out so it does not waterlog.

FIG. 14 depicts the pollution trap 10 in operation during a typical storm, with a typical water flow level 31 in the chamber 12 that is between the at-rest level 32 and the worst storm water level 30. In this state, the water 34 flows into the chamber 12 through the inlet 26, carrying with it pollutants such as the miscellaneous debris 36, particulate matter 38, and floating matter 40. Upon entering the chamber 12, the water 34 flows through the screen 100. But some or all of the vegetative matter, paper, plastic, and/or other miscellaneous debris 36 is retained by the screen 100 and suspended above the at-rest water level 32 so it does not waterlog, rot, and pass through the screen.

The water 34 then flows down into the chamber 12 and some of the sand, grit, and/or other particulate matter 38 settles to the chamber floor. Next the water 34 flows around the baffles to induce additional settling. Some of the water 34 and particulate matter 38 flows back up and through the first baffle top gap while some of it flows downstream through the apertures in the first baffle 200'. Most of the water 34 and particulate matter 38 then flows down, through the bottom gap of the second baffle 200", and under the collection reservoir 300, while some more of the particulate matter 38 settles to the chamber floor. Then the water 34 flows back up toward the outlet 28.

The water 34 flows through the pivotal filter 400, through the outlet 28, and out of the chamber 12. But some of the clay and/or other particulate matter 38 still suspended in the water 34 is filtered and retained in the chamber 12 by the pivotal filter 400.

At the same time, the motor oil, other hydrocarbons, detergents, and/or other floating matter 40 is carried through the inlet 26 and into the chamber 12 along with the water 34. Some of the floating matter 40 stays on the surface of the water 34 and floats over the first baffle 200' through its top gap. And some of the floating matter 40 is forced down with the water 34 upon entering the chamber 12, though its buoyancy causes it to flow to back up toward the surface of the water 34. Some of this temporarily submerged floating matter 40 flows back up and through the first baffle top gap while some of it flows downstream through the apertures in the first baffle 200'.

In any event, the floating matter 40 then flows through the apertures in the second baffle 200" and towards the collection reservoir 300. By this time, most-to-all of the floating matter 40 is on the surface of the water 34. The floating matter 40 builds up into a thick blanket until it is high enough to pass over the skimming edge and fall down into the collection reservoir. The floating matter 40 can be held in the collection reservoir 300 or drained into a separate storage container.

FIG. 15 depicts the pollution trap 10 in operation during the worst storm event for which it was designed, when the trap is processing the maximum water flow rate through the chamber 12. In this state, the worst storm water level 30 is defined by the skimming edge of the collection reservoir 300. Thus, the water level 30 is at the same height as the collection reservoir skimming edge, so the trap 10 is at its maximum operating capacity. But even in this state, the top of the second baffle 200" is above the worst storm water level 30, so that the water 34 cannot flow over the second baffle but instead is encouraged to flow down and under it.

In addition, with the increased water flow rate through the chamber 12, the surging water 34 pushes the pivotal filter 400 up and out of the way, toward the bypass position. Now, since the water 34 is not flowing through the filter 400, it is not impeded by it. Then after the storm subsides, the pivotal filter 400 falls back down into the filtering position shown in FIGS. 13 and 14. Furthermore, after the storm subsides, the miscellaneous debris 36 retained by the screen 100 will be above the at-rest water level 32, so it can dry out and not waterlog.

To install the pollution trap for operation, the chamber is hauled to the installation site and lowered into a pit in the ground using conventional construction equipment. Then the inlet and the outlet are connected to the storm sewer system pipes. For retrofit installations, the existing storm sewer pipes are cut into and the pollution trap installed in-line. For new installations, the new storm sewer pipes are cut to length and connected to the trap. After installing any oil storage containers and/or bypass pipes, the pit is backfilled and the pollution trap is now ready for use.

The storage containers may be installed to hold the hydrocarbons, detergents, and/or other floating matter skimmed into the collection reservoir. This is typically done when a larger volume of floating matter needs to be stored than can be retained in the collection reservoir. For example, one or more containers can be lowered into a pit beside or some distance from the trap, and the drain pipe can then be connected between it and the collection reservoir.

Also, the bypasses may be installed to allow for storms that are worse than the worst storm event for which the trap is intended. For example, a bypass opening can be provided in the chamber above the worst storm water level, and a bypass pipe or the like extended from the bypass opening for directing the bypassed water to above the ground or elsewhere.

As mentioned above, the pollution trap 10 can be configured in a variety of different ways, with different combinations of the screen, baffles, collection reservoir, and pivotal filter filtration stages 100–400. The chamber is sized smaller or larger as needed to house the filtration stages selected for the particular application.

For instance, the pollution trap can be provided with only the screen in applications where filtering vegetative matter or other miscellaneous debris is the primary objective. Alternatively, the trap can be provided with only the baffles in applications where separating particulate matter is the primary objective and/or when the trap is used to treat the water before directing it into another pollution trap. Or both of these stages can be included, but not the collection reservoir, for separating miscellaneous debris and particulate matter but not oil.

As another example, where the primary objective is separating oil or another floatable pollutant, and little or no vegetative and particulate matter is carried by the water, then the pollution trap could be provided with only the collection reservoir. If desired, the screen or a modified version of it could be included to catch any large stray debris that finds its way into the chamber. In addition, where there are space limitations that restrict the size of the front sub-chamber, the baffles could be included to allow most to all of the oil time to get back to the water surface for skimming.

In still another example, the trap is provided with only the pivotal filter, which can be mounted to the chamber sidewalls. This embodiment might be preferable where the primary goal is filtering large amounts of clay or other particular matter. Of course, the pivotal filter can be included with any other of the filtration stages, as may be desired for a given application.

In yet another example, where the primary objective is separating oil or another floatable pollutant, and little or no vegetative and particulate matter is carried by the water, the pollution trap is provided with only the collection reservoir. If desired, the screen or a modified version of it can be included to catch any large stray debris that finds its way into the chamber. And where there are space limitations that restrict the size of the front sub-chamber, the baffles can be included to allow the oil time to get back to the water surface for skimming.

Also, multiple traps can be connected together, with different of the traps having the same or different of the filtration stages. For example, one trap can be configured with the collection reservoir for processing oil during the "first flush" storm event when most of the oil on paved parking lots and streets is flushed away. And another trap can be configured with the baffles for settling particulate matter after the first flush, and connected to the first trap so that it comes on line after the first flush event.

Figure 16:
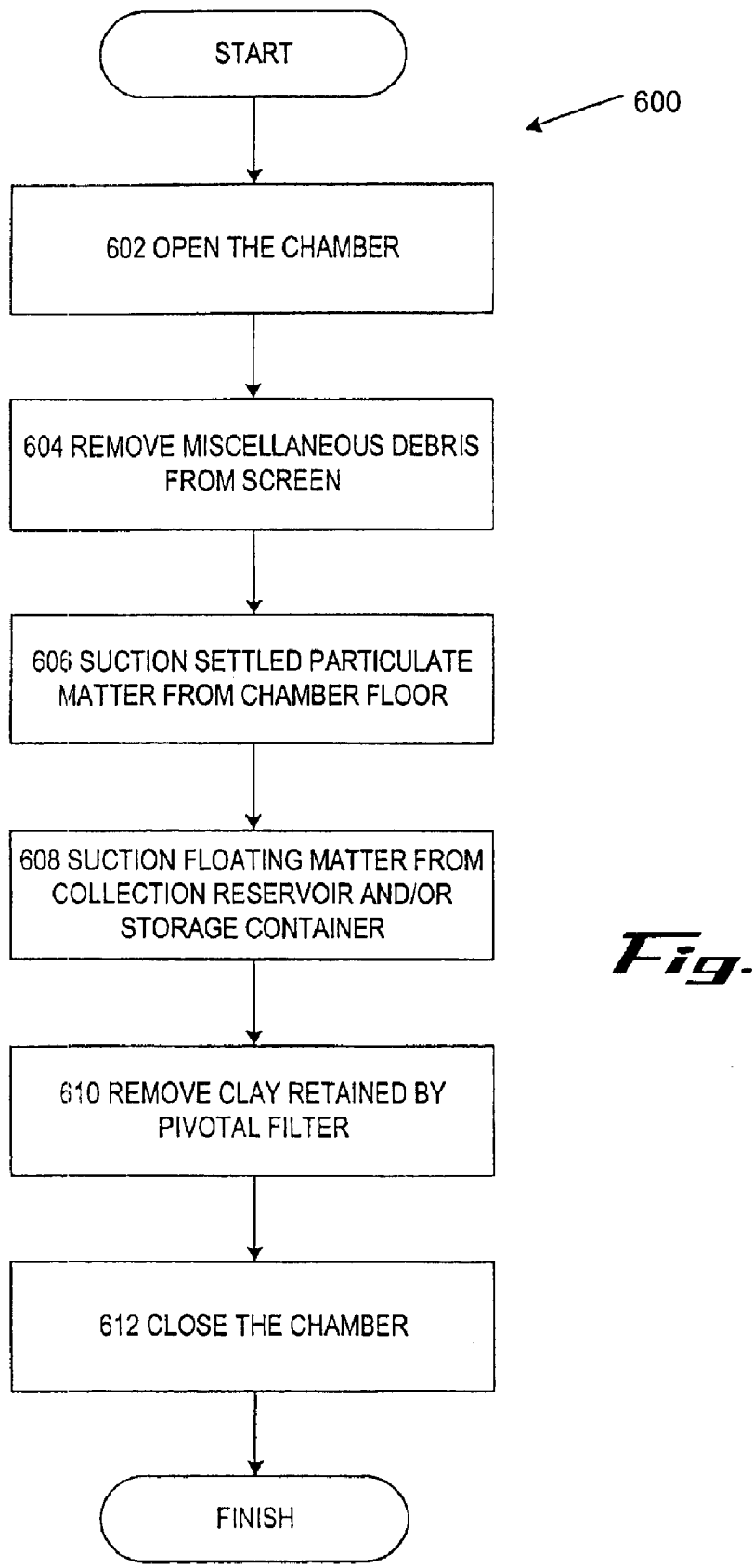
FIG. 16 is a flow diagram showing a maintenance process for cleaning the pollution trap of FIG. 1.

FIG. 16 shows a method 600 for maintaining the pollution trap in good working condition. The maintenance procedure 600 can be performed to clean out the trap as needed (such as after a series of particularly severe storms) and/or at regular intervals. For example, every three months or so a conventional vacuum truck can be dispatched to the site to clean the trap.

To perform the cleaning, at 602 the lid is opened to gain access to the inside of the chamber, then the retained pollutants are removed for disposal offsite. Thus, at 604 the miscellaneous debris is removed from the screen, at 606 the settled particulate matter is suctioned from off the chamber floor, and at 608 the floating matter is suctioned out of the collection reservoir and/or the storage container. The miscellaneous debris is removed from the screen at 604 by suctioning it up while the screen is in the chamber, or by removing, emptying, and replacing the screen. And before removing the floating matter at 608, the maintenance plug may be removed or the weir lowered to allow some or all of the floating matter built up in the front sub-chamber to drain into the collection reservoir and/or the storage container. Of course, afterwards the plug is reinstalled or the weir returned to it operating position. After the oil is removed, it can be recycled for future use, if desired.

In addition, at 610 clay or other particulate matter retained by the pivotal filter is removed. For example, the filtration member of the pivotal filter can be removed then cleaned and replaced or a new one installed if needed. And finally, at 612, the lid is closed. No other regular maintenance is required. The trap is now clean and ready to return to service.

Figure 17:
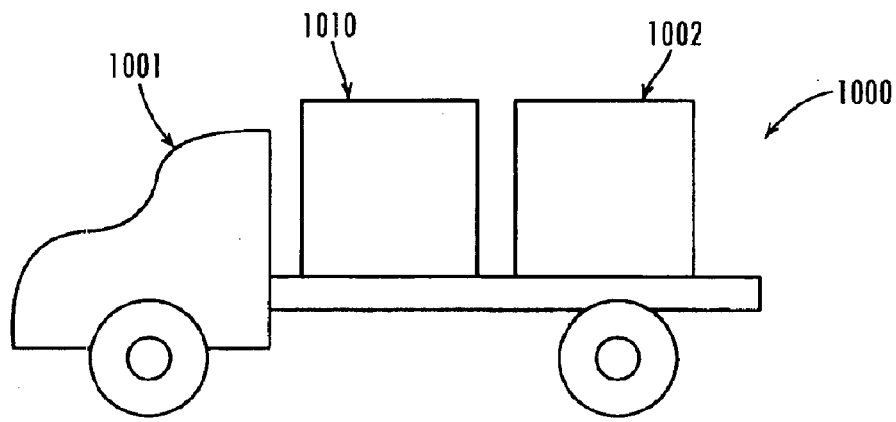
FIG. 17 is a side view of a portable spill clean-up apparatus according to a second exemplary embodiment of the present invention, showing a vehicle, a portable pollution trap similar to the one of FIG. 1, and a pollution trap operating system.
Figure 18:
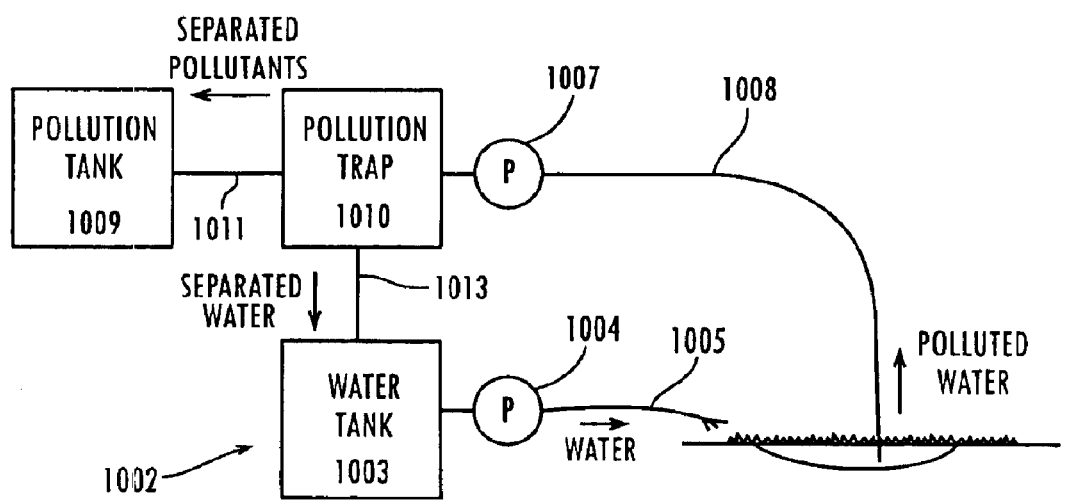
FIG. 18 is a schematic view of the pollution trap operating system of FIG. 17.

Referring now to FIGS. 17 and 18, there is illustrated the second exemplary embodiment of the present invention, referred to generally as the portable clean-up apparatus 1000. The portable clean-up apparatus 1000 can be used to clean up spills, leaks, or other accumulations of floating pollutants such as oil, gasoline, detergents, or a combination of these, whether on land or water. Thus, the portable clean-up apparatus 1000 can be used to clean up spills or leaks from pipeline bursts, tanker leaks (including ships and tractor trailers), gas station fuel tanks, and so forth.

The portable apparatus 1000 includes a vehicle 1001 carrying a pollution trap 1010 and a trap operating system 1002. The vehicle 1001 can be provided by a flatbed truck, another type of truck or automobile, a ship, boat, or submarine, a rail train car, a platform suspended in the air, or any other transportation device selected to support the components of the apparatus 1000 for a particular clean-up application. Alternatively, the pollution trap 1010 and the trap operating system 1002 could be permanently installed at a particular location that is inaccessible by vehicles and/or that experiences frequent spills.

The pollution trap 1010 may be provided by one similar to any of those described herein. Thus, the pollution trap 1010 can be configured with a screen, baffles, a collection reservoir, and a pivotal filter (similar to the first exemplary embodiment), or with only one or a combination of these filtration stages.

Turning now to the details of the trap operating system 1002, it includes a tank 1003, a pump 1004, and a hose 1005, which may be provided by conventional equipment known in the art. The water tank 1003 holds water or another liquid selected for floating the targeted pollutant, the water output pump 1004 draws the water out of the water tank, and the water hose 1005 directs the water toward the spill. In this way, the water in the tank 1003 can be sprayed at the oil or other floating pollutant so that they flow into a collection pool 1006 where the pollution floats in the water.

Alternatively, the tank 1003, pump 1004, and hose 1005 need not be provided where another water source is available to supply the pooling water. For example, these components need not be provided in the operating system 1002 when a conventional water hydrant is available, a separate tanker or pumper truck is used, or when the clean-up apparatus 1000 is used on a ship or boat and the targeted pollution is already floating on water. And the trap operating system 1002 can be provided with the pump 1004 and hose 1005, but not the water tank 1003, in applications where water can be drawn from a nearby retention pond or the like.

In addition, the trap operating system 1002 includes another pump 1007 and another hose 1008, which may be provided by conventional equipment known in the art. The polluted water pump 1007 draws the polluted water from the collection pool 1006, through the polluted water hose 1008, and into the pollution trap 1010. The polluted water then flows through the pollution trap 1010, which separates the pollutants from the water.

Furthermore, the trap operating system 1002 includes a conventional storage tank 1009 for storing the pollution separated from the water by the pollution trap 1010. The separated pollution storage tank 1009 may be connected to the pollution trap 1010 by a pipe 1011, the pollution tank 1009 may be positioned under the trap 1010, and/or they may be arranged otherwise to deliver the separated pollutant to the pollution storage tank. And the water separated from the pollution may be delivered to another tank (not shown) for storage, into the storm sewer system, into a lake, stream, or ocean, or back into the water tank 1003 for reuse. For example, the separated water can be delivered to the water tank 1003 by a pipe 1013. The separated water and the separated pollutant can be drawn out of the pollution trap 1010 by additional pumps (not shown) or they can flow by gravity. Also, the separated pollutant can be delivered to a secondary pollution trap (not shown) for further processing, if desired.

Figure 19:
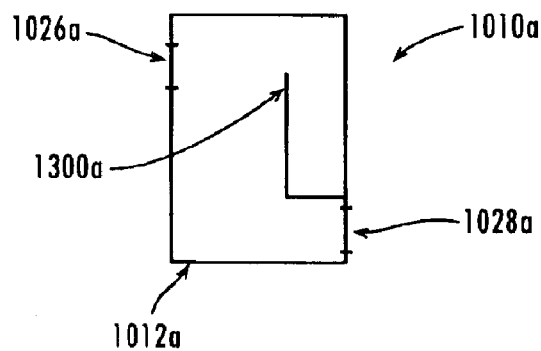
FIG. 19 is a side view of an alternative embodiment of the portable pollution trap of the present invention, showing the pollution trap having a chamber housing a collection reservoir.

FIG. 19 shows an alternative portable pollution trap 1010a that can be used in the clean-up apparatus 1000 of the second exemplary embodiment. In this embodiment, the pollution trap 1010a includes a chamber 1012a with an inlet 1026a and an outlet 1028a, and a collection trap 1300a housed in the chamber. This embodiment may be preferred in clean-up applications where the primary objective is separating floating pollutants from liquid, and filtering other pollutants is less important. For example, when using a boat-mounted clean-up apparatus to clean up oil spills on the ocean, there is typically very little grit and/or vegetative matter that needs to be separated from the seawater.

Figure 20:
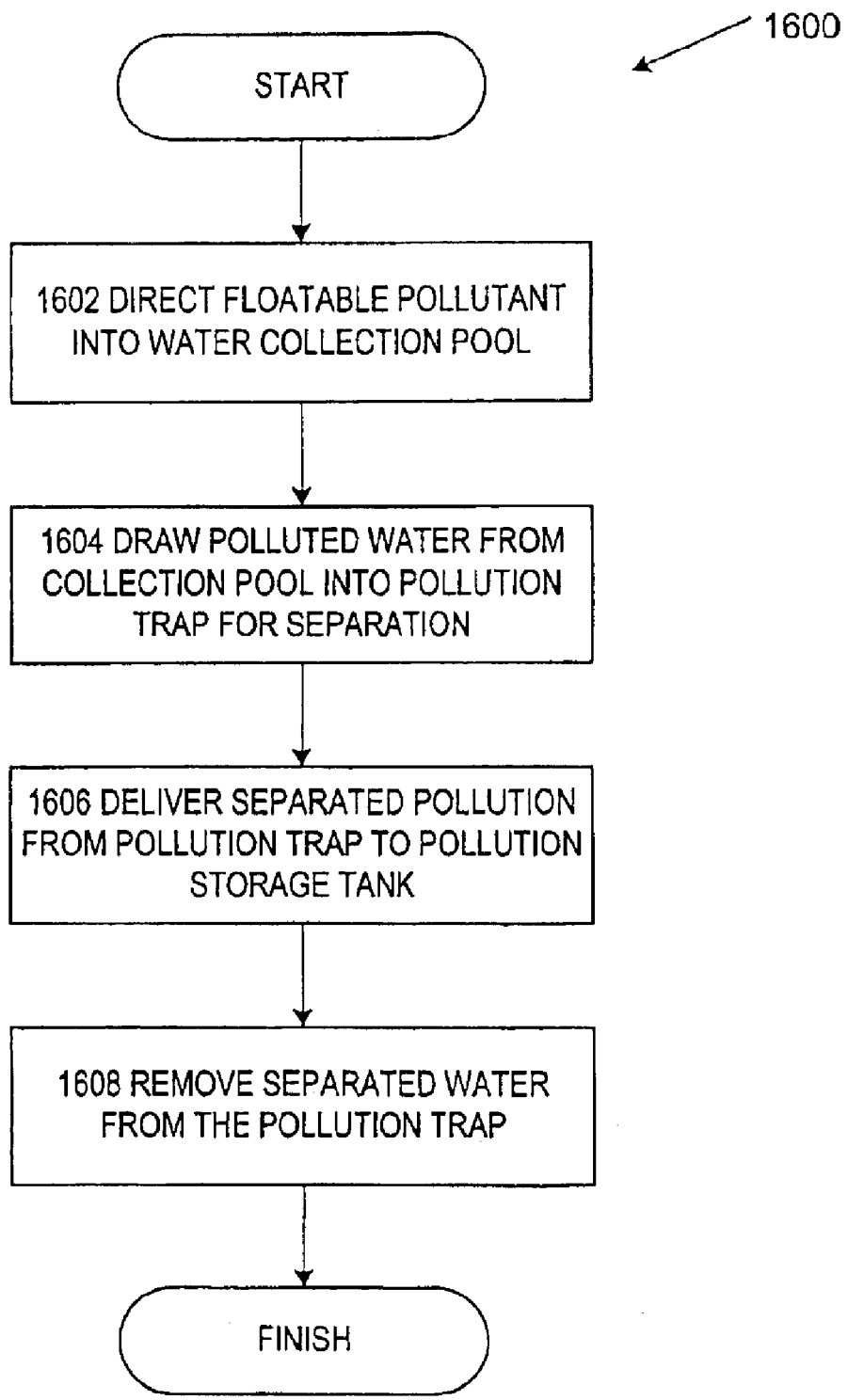
FIG. 20 is a flow diagram showing a process for using the portable spill clean-up apparatus of FIG. 17 to clean up a spill of a floatable pollutant.

FIG. 20 shows a method 1600 for using the portable clean-up apparatus to clean up spills of oil, gasoline, detergents, or other floatable pollutants. To use the portable clean-up apparatus, it is first transported to the spill site by land, water, or otherwise. Then the pollution trap and the trap operating system are operated to clean up the spill and store the cleaned-up pollution. And finally the stored pollutant is properly disposed of, and the portable clean-up apparatus removed from the site. The apparatus is very helpful for cleaning spills of either liquid or solid, onto the ground or into water. The invention is very useful for cleaning up material that is immiscible or insoluble with water and more or less dense than water.

To operate the trap operating system and the pollution trap to clean up the spill, at 1602 the pollutant is first suspended in or floated on water or other liquid in a collection pool. For spills on land, the water or other liquid in the water tank is aimed at the pollutant to direct it into the collection pool. For example, the water pump can be operated to draw the water from the water tank, and the water hose aimed to spray the water onto bushes, grass, the ground, or elsewhere. Alternatively, where another water source such as a water hydrant is available, it can be used instead of the water tank pump, and hose. Or where the clean-up apparatus is carried on a ship or boat and the pollution is already floating on water, step 1602 need not be performed.

Next, at 1604, the polluted water is drawn from the collection pool and into the pollution trap. For example, the polluted water pump can be operated to draw the polluted water from the collection pool, through the polluted water hose, and into the pollution trap. The polluted water then flows through the pollution trap, which skims or otherwise separates the oil or other pollutant from the water.

After the pollution and water are separated, at 1606 the separated pollution is delivered from the pollution trap to the pollution storage tank, for example, through the separated pollution pipe. The oil, gas, or other pollution can then be hauled away and disposed of or recycled. And at 1608 the separated water is removed from the pollution trap. For example, the separated water may be delivered from the pollution trap through the separated water pipe to the water tank for reuse. Alternatively, the separated water may be delivered to the storm sewer system, a lake, stream, or ocean, or it may be otherwise disposed of. Of course, the separated water and the separated pollutant can be delivered from the portable pollution trap to the separated water tank and the separated pollutant tank, respectively, by additional pumps, or they can flow by gravity.

Accordingly, the present invention provides innovative pollution traps that provide a number of advantages over other known oil/grit separators. For example, the pollution traps stay on-line during larger-than-typical water flows, without bypassing or overflowing, to remove and trap more pollutants from the water than other oil/grit separators. In addition, in one form the present invention provides a pollution trap with a collection reservoir for skimming hydrocarbons and other floating matter and dividing the chamber into sub-chambers to further induce settling of the particulate matter. In a combination form the present invention also provides a pollution trap with a uniquely configured screen that reduces waterlogging of absorbent miscellaneous debris and disperses the storm water upon entering the trap to provide improved filtration of the storm water. In yet another combination form the present invention also provides a pollution trap with baffles that disperse and increase the residence time of the water to better induce settling of particulate matter within the trap. And in still another combination form the present invention provides a pivotal filter that filters clay and other particulate matter during typical flows but that automatically pivots to a bypass position, without causing a bypass of any other of the filtration stages, during larger-than-typical storm flows. Moreover, in another form the pollution trap is provided in a mobile configuration with a trap operating system for economical deployment to effectively clean up oil spills. The pollution trap in these forms is cost-efficient to build, install, and maintain.

In the embodiments described above and in the following claims, the words "a," "an," and "one" are not intended to mean "only one" but can also mean any number greater than one. Similarly, plural terms are sometimes used for convenience and are not necessarily intended to mean "more than one" but can also mean just "one." Additionally, the methods are not intended to be limited to the particular sequence of steps described. While the invention has been shown and described in exemplary forms, it will be apparent to those skilled in the art that many modifications, additions, and deletions can be made therein without departing from the spirit and scope of the invention as set forth in the following claims.

What is claimed is:

1. A mobile water pollution trap for separating pollutants from a liquid, comprising:

a chamber having an inlet, an outlet, a floor, a maximum liquid level when the liquid is flowing through the chamber at a predetermined maximum water flow rate, and an at-rest liquid level when none of the liquid is flowing into the chamber;

a collection reservoir disposed in the chamber between the inlet and the outlet, wherein the collection reservoir has a bottom wall and a front wall, the front wall has a skimming edge disposed at the maximum liquid level to skim floating portions of the pollutants into the collection reservoir, and the front wall skimming edge is disposed above the at-rest liquid level and the bottom wall is disposed above the chamber floor to direct the liquid to flow under the collection reservoir in a longer flow route through the chamber and to prevent the liquid from flowing into the collection reservoir;

one or more baffles disposed in the chamber between the inlet and the collection reservoir, wherein each of the baffles comprises a panel with apertures defined therein that permit some of the liquid and pollutants to pass therethrough, and wherein the baffles are configured and positioned in the chamber forming at least one gap through which the liquid may flow around the baffles to increase liquid residence time in the chamber to encourage settling of some of the pollutants; and a trap operating system including an input pump connected to the chamber inlet for drawing the liquid and the pollutants into the chamber, a pollution tank connected to the chamber for receiving the skimmed pollutants from the collection reservoir, and a liquid tank connected to the chamber outlet for receiving the pollutant-free liquid from the chamber.

2. The mobile water pollution trap of claim 1, further comprising a maintenance opening and plug assembly in the collection reservoir at or above the at-rest liquid level.

3. The mobile water pollution trap of claim 1, wherein the collection reservoir has a vertically adjustable weir member coupled to the front wall, wherein the skimming edge is defined by the weir member.

4. The mobile water pollution trap of claim 1, wherein a cross-sectional area under the collection reservoir is larger than a cross-section area of the inlet so that the liquid is not throttled as it flows under the collection reservoir.

5. The mobile water pollution trap of claim 4, wherein the collection reservoir divides the chamber into front and rear sub-chambers and the chamber outlet is disposed above the collection reservoir bottom wall so that the liquid must flow upward to exit the chamber.

6. The mobile water pollution trap of claim 1, further comprising a pivotal filter disposed in the chamber adjacent the collection reservoir and between the collection reservoir and the chamber outlet, wherein the pivotal filter pivots from a filtering position when a typical flow of the liquid is flowing through it toward a bypass position in response to a larger-than-typical flow of the liquid engaging it.

7. The mobile water pollution trap of claim 1, further comprising a screen disposed in the chamber between the chamber inlet and the collection reservoir and disposed at or above the at-rest liquid level so that the screen retains some of the pollutants, allows the liquid to pass therethrough, and suspends the retained pollutants above the at-rest liquid level.

8. The mobile water pollution trap of claim 1, further comprising a vehicle supporting the chamber, the collection reservoir, and the trap operating system.

9. The mobile water pollution trap of claim 1, further comprising an output pump connected to the liquid tank for drawing the liquid out of the liquid tank and a hose connected to the output pump for selecting directing the liquid at portions of the pollution to be subsequently draw into the chamber by the input pump.

10. A mobile trap for separating pollutants from a liquid, comprising:

a chamber having an inlet and an outlet;
  a collection reservoir with a skimming edge disposed in the chamber between the inlet and the outlet, wherein the collection reservoir is configured so the skimming edge skims at least some of the pollutants into the collection reservoir and the liquid is prevented from flowing into the collection reservoir;
  one or more baffles disposed in the chamber between the inlet and the collection reservoir, wherein each of the baffles comprises a panel with apertures defined therein that permit some of the liquid and pollutants to pass therethrough, wherein the baffles are configured and positioned in the chamber to increase liquid residence time in the chamber to encourage settling of some of the pollutants; and
  a trap operating system including an input pump connected to the chamber inlet for drawing the liquid and the pollutants into the chamber, a pollution tank connected to the chamber for receiving the skimmed pollutants from the collection reservoir, and a liquid tank connected to the chamber outlet for receiving the pollutant-free liquid from the chamber.

11. The mobile water pollution trap of claim 10, wherein the chamber has a maximum liquid level when the liquid is flowing through the chamber at a predetermined maximum liquid flow rate, and the collection reservoir skimming edge is disposed at the maximum liquid level.

12. The mobile water pollution trap of claim 10, wherein the chamber has an at-rest liquid level when none of the liquid is flowing into the chamber, and further comprising a maintenance opening and plug assembly in the collection reservoir at or above the at-rest liquid level.

13. The mobile water pollution trap of claim 10, wherein the collection reservoir has a front wall and a vertically adjustable weir member coupled thereto, wherein the skimming edge is defined by the weir member.

14. The mobile water pollution trap of claim 13, wherein the weir member has a float attached thereto for automatically adjusting the weir member.

15. The mobile water pollution trap of claim 10, wherein the collection reservoir has a front wall and a bottom wall disposed above the chamber floor to direct the liquid to flow under the collection reservoir in a longer flow route through the chamber.

16. The mobile water pollution trap of claim 15, wherein a cross-sectional area under the collection reservoir is larger than a cross-section area of the inlet so that the liquid is not throttled as it flows under the collection reservoir.

17. The mobile water pollution trap of claim 15, wherein the collection reservoir divides the chamber into front and rear sub-chambers and the chamber outlet is disposed above the collection reservoir bottom wall so that the liquid must flow upward to exit the chamber.

18. The mobile water pollution trap of claim 10, wherein the chamber outlet is disposed in a sidewall of the chamber, and wherein the chamber outlet is disposed under the collection reservoir or the collection reservoir extends to a floor of the chamber.

19. The mobile water pollution trap of claim 10, wherein the collection reservoir has a curved front wall, a tapered bottom wall, or both.

20. The mobile water pollution trap of claim 10, wherein at least one of the baffles has a top disposed above the maximum liquid level and above the skimming edge so that during typical liquid flows the at least one baffle prevents back-flow of pollutants thereover and the pollutants accumulate in front of the collection reservoir.

21. The mobile water pollution trap of claim 10, further comprising a pivotal filter disposed in the chamber between the collection reservoir and the chamber outlet, wherein the pivotal filter pivots from a filtering position when a typical flow of the liquid is flowing through it toward a bypass position in response to a larger-than-typical flow of the liquid engaging it.

22. The mobile water pollution trap of claim 21, wherein the pivotal filter is coupled to the collection reservoir.

23. The mobile water pollution trap of claim 10, further comprising a vehicle supporting the chamber, the collection reservoir, and the trap operating system.

24. The mobile water pollution trap of claim 10, further comprising an output pump connected to the liquid tank for drawing the liquid out of the liquid tank and a hose connected to the output pump for selecting directing the liquid at portions of the pollution to be subsequently draw into the chamber by the input pump.

* * * * *